United States Patent [19]
Nakanishi et al.

[11] Patent Number: 5,969,832
[45] Date of Patent: Oct. 19, 1999

[54] PROJECTION IMAGE DISPLAY DEVICE

[75] Inventors: Hiroshi Nakanishi, Sakurai; Masahiro Adachi, Nara; Toshiyuki Makii, Kitakatsuragi-gun; Nobuyoshi Nagashima; Takeshi Masuda, both of Tenri, all of Japan

[73] Assignee: Sharp Kabushiki Kaisha, Osaka, Japan

[21] Appl. No.: 08/751,889

[22] Filed: Nov. 18, 1996

[30] Foreign Application Priority Data

Nov. 28, 1995 [JP] Japan .................................. 7-309376
Sep. 12, 1996 [JP] Japan .................................. 8-242202

[51] Int. Cl.$^6$ ........................................ G02B 5/32
[52] U.S. Cl. ................................ 359/15; 359/22; 349/5; 349/8; 349/95; 349/108; 353/34
[58] Field of Search ................................ 359/15, 1, 22, 359/25; 349/5, 7, 8, 95, 106, 108; 353/31, 32, 34

[56] References Cited

U.S. PATENT DOCUMENTS 5,546,206   8/1996   Nakanishi et al. .......................... 349/5
5,737,040   4/1998   Ichikawa et al. .......................... 359/15

FOREIGN PATENT DOCUMENTS

0465171A2   1/1992   European Pat. Off. .
0633702A1   1/1995   European Pat. Off. .
59-230383  12/1984   Japan .
4-60538     2/1992   Japan .
5-249318    9/1993   Japan .
6-222361    8/1994   Japan .
07098454    4/1995   Japan .

OTHER PUBLICATIONS

Patent Abstracts of Japan of 4–60538, H. Hiroshi, in English.
Patent Abstracts of Japan of 5–249318, S. Hidefumi, in English.
Patent Abstracts of Japan of 6–222361, I. Nobuhiko, in English.

Shunsuke Kobayashi, "Color LIquid Crystal Display", pp. 115–123.

P. Janssen, *Euro Display '93*, "A novel single light valve high brightness HD color projector", pp. 249–252.

*Primary Examiner*—Cassandra Spyrou
*Assistant Examiner*—Darren E. Schuberg
*Attorney, Agent, or Firm*—Dike, Bronstein, Roberts & Cushman, LLP; David G. Conlin; Henry D. Pahl

[57] ABSTRACT

A projection image display device includes, a light source, an image display panel having a number of pixels and a vertical scanning function, an optical system for dividing light from the light source into a plurality of lights of different wave ranges and directing and overlapping the divided plural lights onto an area from different directions, a light-collector for collecting each of the plural divided lights directed onto the area by the optical system into apertures of pixels of the image display panel corresponding to the wave range of the light, a projector for projecting an image displayed on the image display panel, and a color-changer for mutually changing, at every vertical scanning of the image display panel, the directions in which the optical system directs the plural divided lights of the different wave ranges, so as to mutually change the wave ranges of light directed to the pixels of the image display panel sequentially. The image display panel displays an image with each of the pixels displaying a color of the wave range of light directed to the pixel at every change by the color-changer.

25 Claims, 20 Drawing Sheets

| | VERTICAL SCANNING PERIOD | | |
|---|---|---|---|
| | 1 | 2 | 3 |
| a | R | B | G |
| b | G | R | B |
| c | B | G | R |

DIRECTION OF MOVE

FIG.30
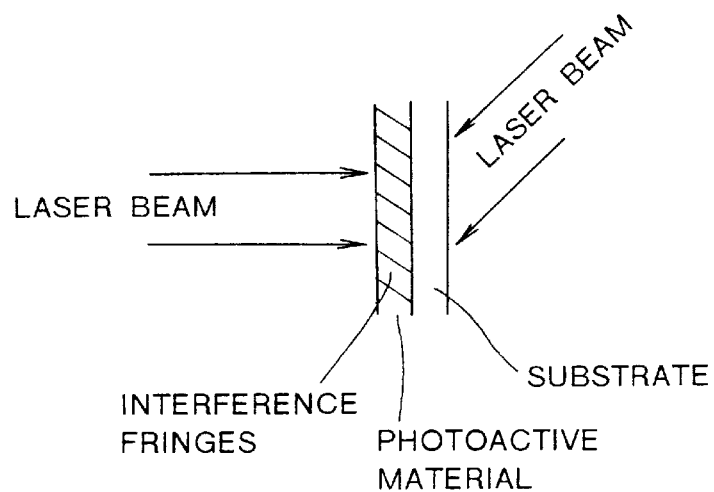
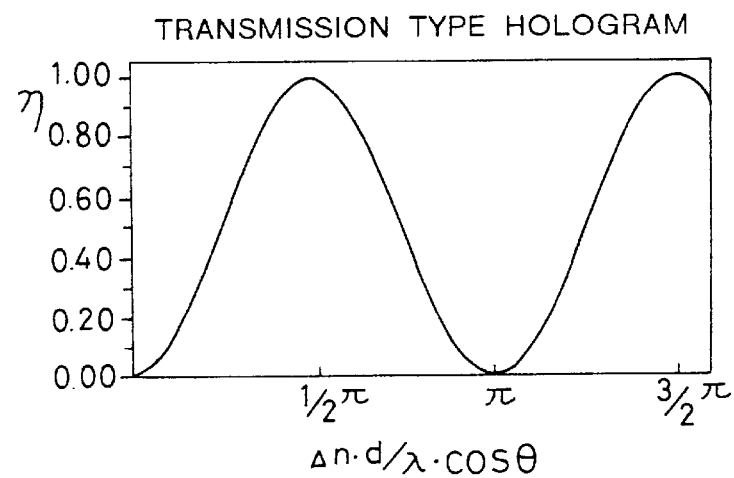
FIG.31A
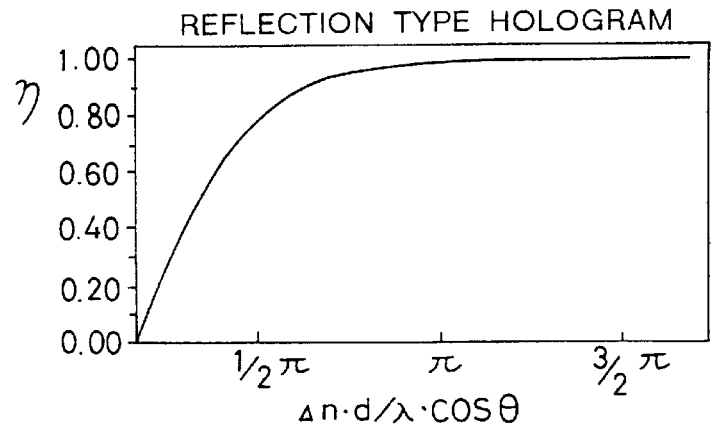
FIG.31B

PROJECTION IMAGE DISPLAY DEVICE

BACKGROUND OF THE INVENTION

1. Field of the Invention

The present invention relates to a projection image display device, more particularly to a projection one-panel color liquid crystal display device providing color display with one liquid crystal display panel without using any color filters. Such a display device can be used particularly for a compact projection color liquid crystal television system or information display system.

2. Description of Related Art

The projection liquid crystal display device must be provided with a light source since it does not emit light itself. The projection liquid crystal display device has great advantages over projection Braun-tube display devices, because of wider variety of reproducible colors, smaller size, lighter weight and unnecessary convergence adjustment. Further development of the projection liquid crystal display device is highly expected.

For carrying out projection color display using a liquid crystal display panel, there are two systems which are conventionally employed, that is, a three-panel system using three liquid crystal display panels for three primary colors and a one-panel system using only one panel. The former three-panel system includes an optical system for dividing white light into three primary color lights, i.e. red, green and blue (hereafter referred to as R, G and B), and three liquid crystal display panels for controlling the three color lights to produce an image. The image is displayed in full color by optically superposing images of all the color lights. The three-panel system utilizes light emitted by a white light source effectively. However, the optical system is complicated and the number of components is large. Therefore, the three-panel system is generally disadvantageous in cost and size, compared with the later-described one-panel system.

The latter one-panel system is designed to project an image on a liquid crystal display panel having a color filter pattern of the three primary colors in mosaic or in stripes by a projection optical system, for example as described in Japanese Unexamined Patent Publication No. Sho 59(1984)-230383. The one-panel system uses only one liquid crystal panel and a optical system less complicated than that of the three-panel system. Therefore the one-panel system is suitable for a low-cost, small-sized projection system. However, because the color filter used in the one-panel system absorbs light, the one-panel system can only provide images one-third as bright as those provided by the three-panel system using a light source of equal brightness. As for resolution, because three pixels of the liquid crystal display panel corresponding to R, G and B are required to operate as a group to display an image, the resolution of the one-panel system is also one-third as good as that of the three-panel system.

Using a brighter light source may be one solution to the poor brightness. The brighter light source, however, consumes more power, and therefore is not desirable for consumers' use. In addition, since luminous energy of light absorbed by the color filter changes to heat, the brighter light source not only causes rise in temperature of the liquid crystal display panel but also accelerates loss of color of the color filter.

Therefore, to utilize provided light effectively is important for heightening the utility value of the projection image display device.

In order to improve the brightness of the one-panel liquid crystal display device, it has been proposed to throw white light on dielectric mirrors such as dichroic mirrors arranged fanwise, divide the white light into three luminous fluxes of R, G and B, direct the luminous fluxes incident at different angles on a microlens array disposed on the light source side of the liquid crystal display panel, and separately sending each of the luminous fluxes passing through the microlenses according to their incident angles onto a site on the liquid crystal which is driven by a display electrode to which a color signal corresponding to the luminous flux directed onto the site is applied, thereby the device making better use of the provided light [see Japanese Unexamined Patent Publication No. Hei 4(1992)-60538].

Also, for better utilization of the light, a device using transmission type hologram elements corresponding to R, G and B in the light from the light source in place of the above-mentioned dielectric mirrors and a device using a transmission type hologram element having periodic mechanism corresponding to a pixel pitch of the liquid crystal display panel, thereby the device being provided with functions of a microlens and a dielectric mirror, are described in Japanese Unexamined Patent Publication Nos. Hei 5(1993)-249318 and Hei 6(1994)-222361 respectively.

In order to solve the poor resolution, i.e., the other deficiency of the one-panel system, a one-panel system using a field sequential system which has resolution equal to the three-panel system is described on pages 115 to 123 of "Color Liquid Crystal Display" (written by Shunsuke Kobayashi published by Sangyotosho on Dec. 14, 1990). The field sequential system takes advantage of a phenomenon in which, when colors are sequentially changed in time division at such a rate that the eye cannot follow, all the colors are perceived as a mixture (this phenomenon being called a continuous additive color mixture). FIG. 29 shows a exemplary structure of the field sequential system.

Referring to FIG. 29, a disc constituted of color filters of R, G and B is rotated at a high rate in accordance with vertical scanning of the liquid crystal display panel, and an image signal corresponding to the color of a filter at each divided time is input to the liquid crystal display panel. A observing person perceives a compound of images corresponding to the colors. Therefore, unlike the above-described one-panel system, since a dot of the liquid crystal display panel displays images of R, G and B at divided times, the resolution thereof equals that of the three-panel system.

Further, another example of the above-described field sequential system is described on pages 249 to 252 of "Euro Display '93," in which white light from a light source is divided into luminous fluxes of R, G and B with dielectric mirrors, the luminous fluxes are directed onto different areas of a liquid crystal display panel, and a cubic prism disposed in front of the liquid crystal panel is rotated so that a position irradiated by each of the luminous fluxes changes.

However, though the systems described in Japanese Unexamined Patent Publication Nos. Hei 4(1992)-60538, Hei 5(1993)-249318 and Hei 6(1994)-222361 have improved the brightness, none of them have improved the resolution. The resolution remains one-third as good as that the three-panel system because three dots corresponding to R, G and B operate as a group to display an image.

The field sequential system has realized the resolution equal to that of the three-panel system, but still has the same problem with brightness as the conventional one-panel method.

Besides, the system described on pages 249 to 252 of "Euro Display '93" requires extremely parallel light to be provided so that the luminous fluxes of R, G and B will not overlap. Due to this requirement about the light, the system cannot make full use of light.

Therefore, none of the above-mentioned systems have solved both the problems of poor brightness and resolution.

SUMMARY OF THE INVENTION

The present invention is designed to solve these problems in the conventional techniques, and to provide a projection image display device capable of displaying a bright and uniform image with good resolution, which is also small in size and costs less.

The present invention provides a projection image display device comprising a light source; an image display panel having a number of pixels and a vertical scanning function; optical means for dividing light from the light source into a plurality of lights of different wave ranges and directing and overlapping the divided plural lights onto an area from different directions; light-collecting means for collecting each of the plural divided lights directed onto the area by the optical means into apertures of pixels of the image display panel corresponding to the wave range of the light; projection means for projecting an image displayed on the image display panel; and color-changing means for mutually changing, at every vertical scanning of the image display panel, the directions in which the optical means directs the plural divided lights of the different wave ranges, so as to mutually change the wave ranges of light directed to the pixels of the image display panel sequentially, wherein the image display panel displays an image with each of the pixels displaying a color of the wave range of light directed to the pixel at every change by the color-changing means.

According to the invention, the white light from the light source is divided into luminous fluxes of a plurality of wave ranges, each of the luminous fluxes is directed to the corresponding apertures of pixels of one image display panel and modulated. At this time, incident angles of the luminous fluxes are sequentially changed to one another synchronously with the vertical scanning period of the image display panel. Thereby loss of light conventionally caused by the color filter can be eliminated, brighter image display can be obtained and also the resolution can be three times as good as that of the conventional one-panel system.

BRIEF DESCRIPTION OF THE DRAWINGS

FIG. 30 illustrates write-in on a hologram with interference of two luminous fluxes;

FIGS. 31A and 31B are graphs showing diffraction efficiency of a hologram device by Kogelnik's coupled wave theory.

DESCRIPTION OF THE PREFERRED EMBODIMENTS

Figure 1:
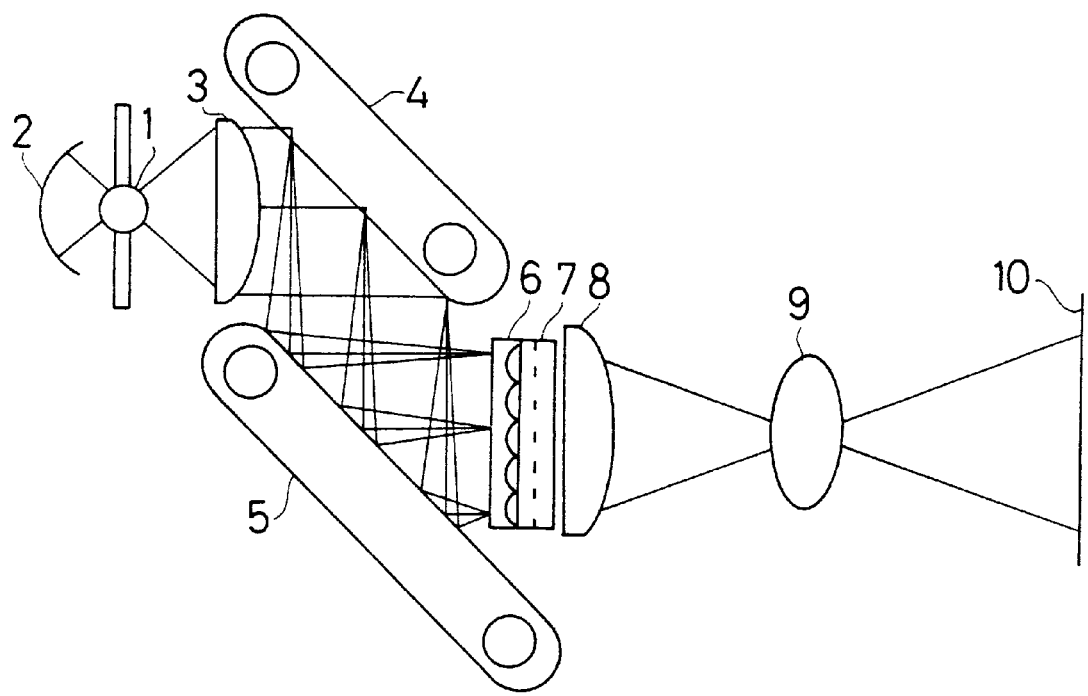
FIG. 1 illustrates a system of a projection color image display device in Embodiment 1.

The present invention provides, in the second aspect, a projection image display device comprising a light source; an image display panel having a number of pixels and a vertical scanning function; optical means having wavelength selectivity for dividing light from the light source into a plurality of lights of different wave ranges and directing each of the divided lights to a corresponding one of divisional areas of the image display panel; projection means for projecting an image displayed on the image display panel; and color-changing means for mutually changing the directions in which the optical means directs the plural lights of the different wave ranges, at every vertical scanning of the image display panel, so as to mutually change the wave ranges of light directed to the divisional areas of the image display panel sequentially, wherein the image display panel displays an image with each of the divisional areas displaying a color of the wave range of light directed onto the divisional area at every change by the color-changing means.

According to the above-described invention, the white light from the light source is divided into luminous fluxes of a plurality of wave ranges by optical means having the wavelength selectivity. The luminous fluxes are directed to different areas on the image display panel so that none of the luminous fluxes overlaps any other luminous flux, and the luminous fluxes are modulated. At this time, the area to which each of the luminous fluxes is directed is sequentially changed to one another synchronously with the vertical scanning period of the image display panel. Thereby loss of light conventionally caused by the color filter can be eliminated, color shading conventionally observed with a wave-length non-selective prism used as the optical means can be avoided, brighter image display can be obtained and resolution can be three times as good as that of the conventional one-panel system.

In the third aspect of the present invention, it provides a projection image display device comprising a light source; an image display panel having a number of pixels and a vertical scanning function; optical means for dividing light from the light source into a plurality of lights of different wave ranges and directing and overlapping the plural divided lights onto an area from different directions; light-collecting means for collecting each of the plural divided lights directed onto the area by the optical means into apertures of pixels of the image display panel corresponding to the wave range of the light; projection means for receiving lights modulated by the image display panel and projecting an image displayed on the image display panel; and color-changing means for moving the light-collecting means by pixel pitch at every vertical scanning of the image display panel so as to mutually change the wave ranges of light directed to the pixels of the image display panel sequentially, wherein the image display panel displays an image with each of the pixels displaying a color of the wave range of light directed to the pixel at every change by the color-exchanging means.

According to the above-described invention, the white light from the light source is divided into luminous fluxes of a plurality of wave ranges, each of the luminous fluxes is directed to the corresponding apertures of pixels of one image display panel and is modulated. At this time, the light-collecting means for directing the luminous fluxes into the corresponding apertures of the pixels of the image display panel is moved from one position to another by pixel pitch synchronously with the vertical scanning period of the image display panel. Thus the aperture of each pixel of the image display panel receives the luminous fluxes of the different wave ranges by turns. Thereby, loss of light conventionally caused by the color filter can be eliminated, brighter image display can be obtained and also the resolution can be three times as good as that of the conventional one-panel system.

In the fourth aspect of the present invention, it provides a projection image display device comprising a light source; an image display panel having a number of pixels and a vertical scanning function; optical means for dividing light from the light source into a plurality of luminous fluxes of different wave ranges and directing and overlapping the divided plural luminous fluxes onto an area from different directions; collecting means for collecting each of the plural divided luminous fluxes of the different wave ranges into apertures of pixels of the image display panel corresponding to the wave range of the luminous flux; projection means for receiving lights modulated by the image display panel and projecting an image displayed on the image display panel; and color-changing means for mutually changing incident angles of the plural luminous fluxes of the different wave ranges to the image display panel synchronously with the vertical scanning of the image display panel so as to change the wave range of light directed to each pixel of the image display panel sequentially, wherein the image display panel displays an image with each of the pixels displaying a color of the wave range of light directed to the pixel at every change by the color-changing means.

According to the above-described invention, the optical means divides the white light from the light source into luminous fluxes of a plurality of wave ranges. Each of the luminous fluxes is directed to the corresponding apertures of pixels of one image display panel by the light-collecting means and is modulated by the image display panel. At this moment, incident angles of the luminous fluxes to the image display panel are changed to one another synchronously with the vertical scanning period of the image display panel. The aperture of each pixel of the image display panel receives the luminous fluxes of the different wave ranges by turns. Thus the field sequential system is realized. Thereby, the light loss conventionally caused by the color filter can be avoided, and a brighter image can be realized. In addition, the resolution can be three times as good as that of the conventional one-panel system.

In the present invention, a variety of lamps such as metal halide lamp, halogen lamp and xenon lamp may be used as the light source.

As the image display panel, any kind of display panel may be used provided that it can display an image with a lot of pixels and have the vertical scanning function. It is most preferred to use a transmission liquid crystal display panel. Such a liquid display panel may be of various kinds liquid crystal such as TN(twisted nematic)-mode liquid crystal, bistable nematic liquid crystal and ferroelectric liquid crystal provided that they have a response shorter than their vertical scanning periods.

The optical means may be one which is able to divide the light from the light source into a plurality of wave ranges and direct the divided lights onto an area from different directions so that they overlaps or directs the divided lights onto different divisional areas on the image display panel. A variety of optical elements such as reflection or transmission type hologram element and dielectric mirror which have wavelength selectivity may be used as combination with an optical system such as plane mirror, concave mirror, convex mirror, concave lens and convex lens for changing an optical path from the optical element to the image display panel.

For example, when the optical means includes a hologram element, the hologram element has different diffraction angles for different wave ranges. In this case, the hologram element may be only one element which can work on a plurality of wave ranges, or may be a combination of hologram elements each working on one wave range, whereby the hologram element divides white light into luminous fluxes of plural wave ranges.

Referring to FIG. 30, the hologram element used in the present invention may be produced by recording interference fringes of two luminous fluxes generated on a substrate for recording hologram as difference in refraction index ($\Delta n$). Here, the two luminous fluxes is set to make such an angle that the lights of wave ranges used will meet Bragg's diffraction conditions, as described on pages 77 to 81 of "Laser and Image" written TATSUOKA, Shizuo (published by Kyoritsu Shuppan).

Diffraction efficiency η of the hologram element can be obtained by Kogelnik's coupled wave theory, represented by $$\eta = \tan h^2(\pi \Delta nd/\lambda \cos \theta) \qquad \text{Formula 1}$$

for reflection type hologram, and represented by $$\eta = \sin^2(\pi \Delta nd/\lambda \cos \theta) \qquad \text{Formula 2}$$

for transmission type hologram (see FIGS. 31A and 31B).

In these formulae, d is thickness of a hologram element, λ is wavelength of a diffracted light, and θ is an angle made by two luminous fluxes.

The hologram element needs to be produced to have a high diffraction efficiency based on the above formulae 1 and 2. Especially in production of the transmission hologram element, since the diffraction efficiency varies periodically as Δnd/λ cos θ changes, even a slight difference in settings will lead to a decline in diffraction efficiency. Accordingly, conditions must be more strictly set for the transmission type hologram, compared with the reflection type hologram whose diffraction efficiency rises monotonously until Δnd/λ cos θ reaches 1 and thereafter remains at almost 100%.

Alternatively, when the optical means includes a dielectric mirror, a plurality of dielectric mirrors corresponding to lights of plural wave ranges are used. In this case, the plural dielectric mirrors each working on a specific wave range may be layered or combined in a plane.

As the light-collecting means, a microlens array and a transmission type hologram element may be used, for example.

As the projection means, a conventionally known optical system may be used.

The color-changing means is able to change the wave ranges of the lights directed or irradiated onto the image display panel by turns. For this purpose, the color-changing means may be a drive device to drive the optical means, or to drive the light-collecting means. Alternatively, when the above-mentioned optical system having the optical-path changing function, the color-changing means may be a drive device to drive this optical system.

For example, the drive device for driving the optical means, when the optical means is made of the hologram element, moves or rotates the hologram element or change angles of the hologram element so as to change by turns the wave ranges (incident angles) of the lights directed or irradiated onto the image display panel. When the optical means is made of the dielectric mirrors, the drive device moves or rotates the dielectric mirrors or change angles of the dielectric mirrors so as to change by turns the wave ranges (incident angles) of the lights directed or irradiated onto the image display panel.

Alternatively, the drive device for driving the light-collecting means, for example, when the light-collecting means is made of the microlens array, moves or rotates the microlens array or change angles of the microlens array by pixel pitch so as to change by turns the wave ranges (incident angles) of the lights directed or irradiated onto the image display panel. Or when the light-collecting means is made of the transmission type hologram element, the drive device moves or rotates the transmission type hologram element or change angles of the transmission type hologram element so as to change by turns the wave ranges (incident angles) of the lights directed or irradiated onto the image display panel.

The drive device for driving the optical system having the optical-path changing function, for example, when the optical system is made of a plane mirror or a lens, moves or rotates the plane mirror or the lens or change angles of the plane mirror or the lens so as to change by turns the wave ranges (incident angles) of the lights directed or irradiated onto the image display panel.

The above-mentioned drive device may be various manipulators or stepping motors.

Figure 24:
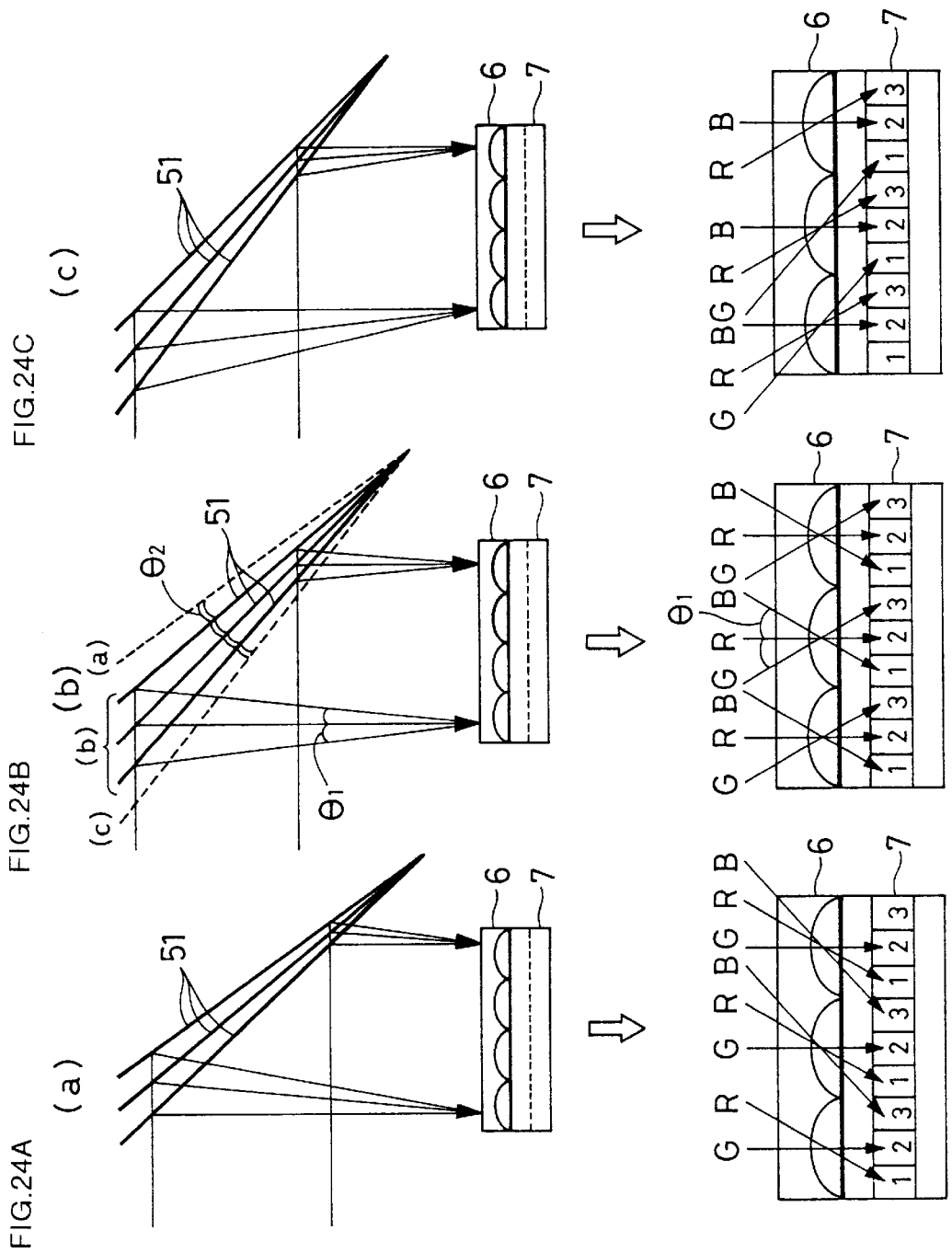
FIGS. 24A, 24B and 24C illustrate states of divided lights being incident on the liquid crystal display panel in Embodiment 5.
Figure 26:
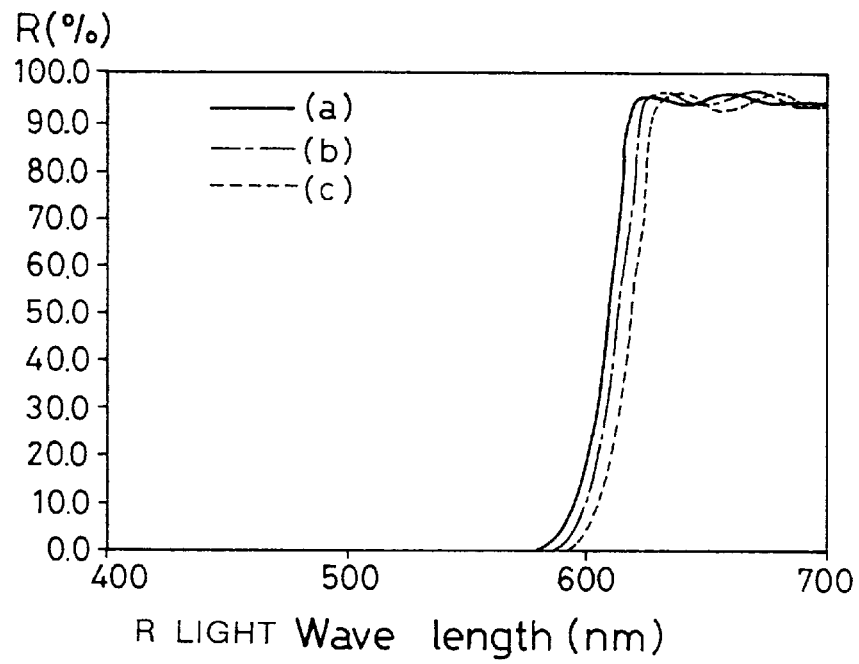
FIG. 26 is a graph showing wave range of R light reflected by the dielectric mirror in Embodiment 5.
Figure 27:
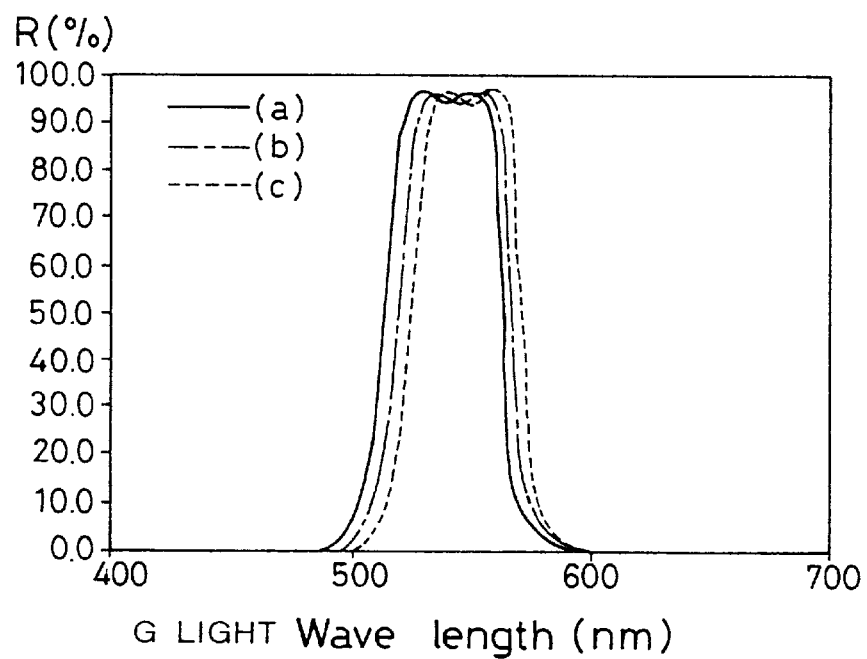
FIG. 27 is a graph showing wave range of G light reflected by the dielectric mirror in Embodiment 5.
Figure 28:
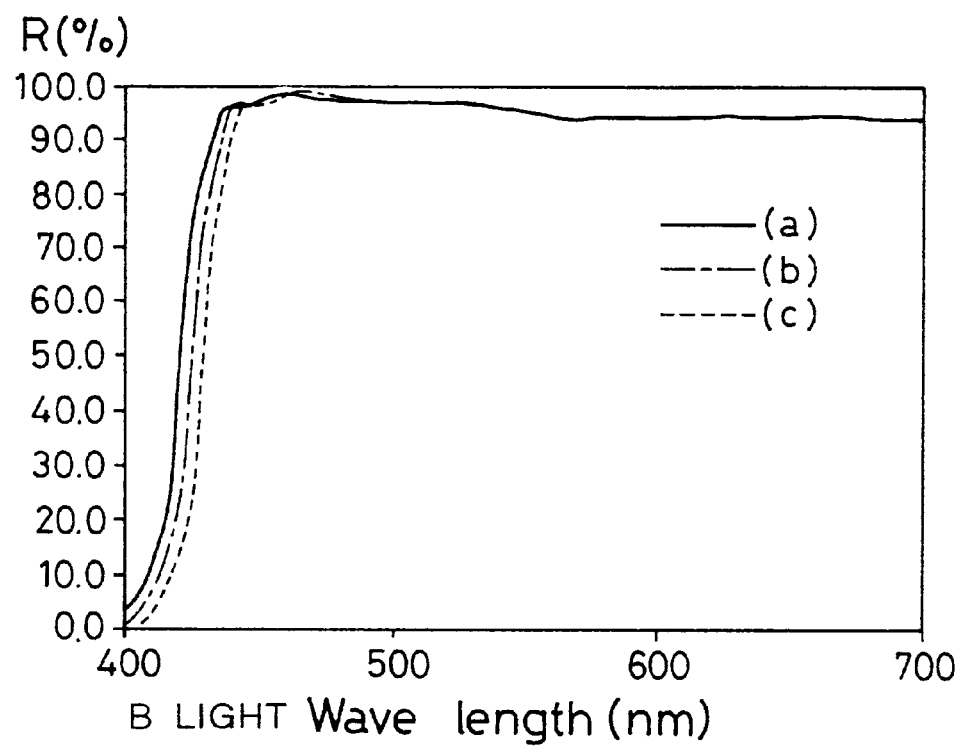
FIG. 28 is a graph showing wave range of B light reflected by the dielectric mirror in Embodiment 5.
Figure 29:
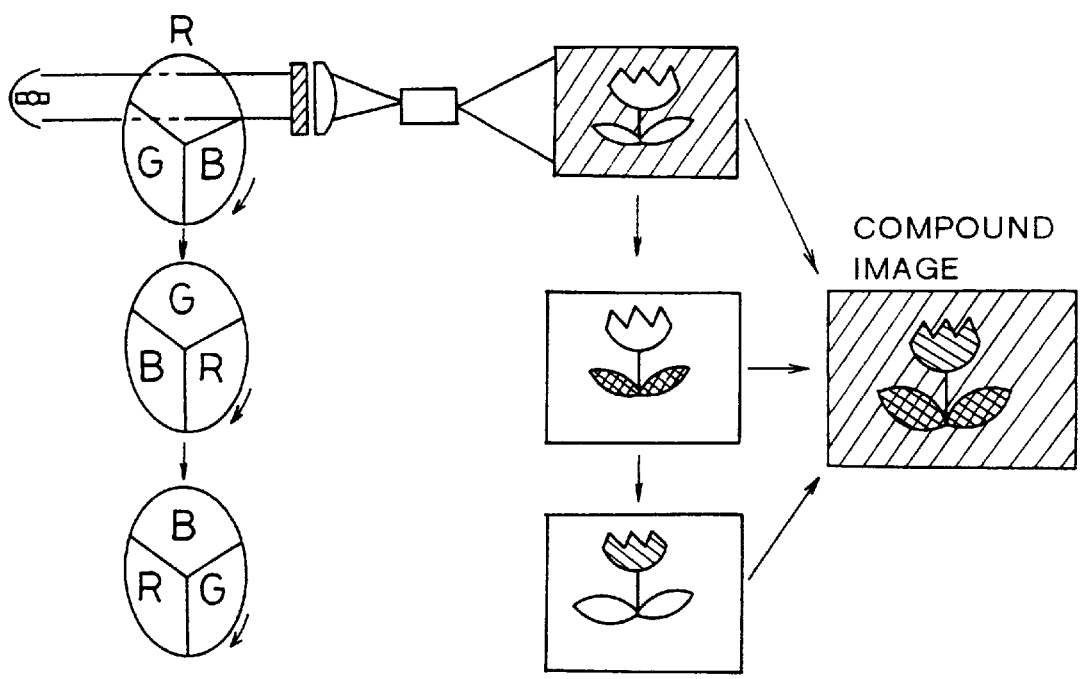
FIG. 29 illustrates the conventional field sequential system.

Referring to FIG. 26, 27 and 28, when the above-mentioned drive device changes angles of the dielectric mirrors and the white light is divided into the three primary colors R, G and B, the wave ranges of the lights directed onto the pixels of the image display panel are shifted in accordance with the change of the angles of the plural dielectric mirrors to the luminous flux from the light source. In other words, when the incident angles are in states (a), (b) and (c) as shown in FIGS. 24A, 24B and 24C, the wave ranges shift as (a), (b) and (c) in FIGS. 26, 27 and 28. Thus, the wave range of light reflected by the dielectric mirror tends to be dependent on the incident angle of the light. Therefore, the plural dielectric mirrors must be designed so that a compound of all luminous fluxes reflected by the dielectric mirrors will reproduce sufficient color ranges.

In the display device having the above construction, taking the three primary colors R, G and B for example, a full color image can be displayed in every three vertical scanning periods by directing by turns the lights R, G, and B to every three adjacent pixels (a, b, c) of the image display panel synchronously with the vertical scanning of the image display panel. The following table explains an example:

|  | Vertical Scanning Periods | | |
|---|---|---|---|
|  | First Period | Second Period | Third Period |
| 1st Pixel (a) | R | B | G |
| 2nd Pixel (b) | G | R | B |
| 3rd Pixel (c) | B | G | R |

The present invention will become apparent from the following description of embodiments with reference to the accompanying drawing, which is not intended to limit the scope of the invention.

EMBODIMENT 1

FIG. 1 illustrates a system of a projection color image display device of Embodiment 1.

Referring to FIG. 1, the reference numeral 1 denotes a light source, 2 a spherical mirror, 3 a condenser lens, 4 and 5 a first and a second hologram device as optical means, 7 a liquid crystal display panel provided with a microlens array 6 as the light-collecting means, 8 a field lens, 9 a projection lens, and 10 a screen. The field lens 8 and the projection lens 9 function as the projection means.

In this embodiment, the liquid crystal panel 7 is used as the image display panel. The light source 1 is a metal halide lamp of 150 W, 5 mm arc length, and 2.2 mm arc diameter, and is disposed so that the arc thereof is horizontal to the paper sheet on which FIG. 1 is drawn. The light source 1 may be a halogen lamp or a xenon lamp instead. The spherical mirror 2 is disposed behind the light source 1 and the condenser lens 3 of 80 mmφ caliber and 60 mm focal length is disposed in front of the light source 1.

The spherical mirror 2 is disposed so that the center thereof agrees with the center of the light-emitting portion of the light source 1. Further, the light source 1 is disposed so that the center thereof agrees with the focus of the condenser lens 3. In such an arrangement, the parallel degrees of light which is emitted by the light source 1 and then passes through the condenser lens 3 is about 2.2° in the direction of the arc length (direction horizontal to the sheet) and about 1° in the direction of the arc diameter.

Disposed ahead of the condenser lens 3 are the first reflection type hologram device 4 diffracting three primary color lights R, G and B in the light from the light source 1 in different directions, and the second reflection type hologram device 5 receiving the diffracted lights R, G and B from the first hologram device 4 and diffracting the received lights to make them incident at different angles to the liquid crystal display panel 7 provided with the microlens array 6.

The first and second hologram devices 4, 5 are provided with rotary mechanisms (drive device) in the form of caterpillars as the color-changing means. The lights R, G and B modulated by the liquid crystal display panel 7 pass through the field lens 8 and then are projected onto the screen 10 by the projection lens 9.

Figure 2:
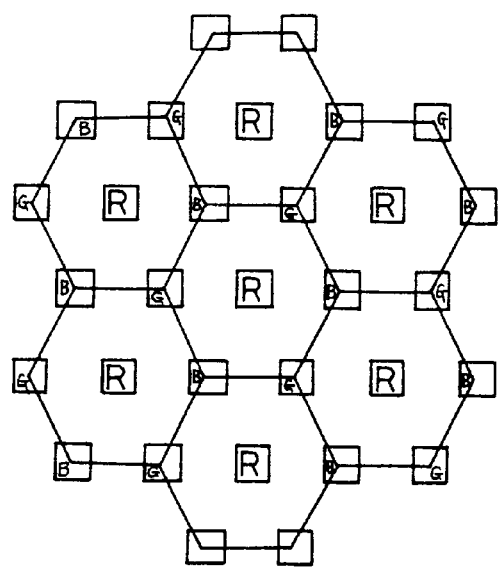
FIG. 2 illustrates layout of microlenses in Embodiment 1.

In this embodiment, one microlens corresponds to three pixels of the liquid crystal display panel 7 as shown in FIG. 2. The liquid crystal display panel 7 interlacingly drives scanning lines of 480(H)×640(V). The pixel pitch is 130 $\mu$m×130 $\mu$m. The incident angles of R, G and B to the liquid crystal display panel 7 are obtained from the later-described pixel pitch P of the liquid crystal display panel 7 and the focal length f of the microlens.

Figure 3A:
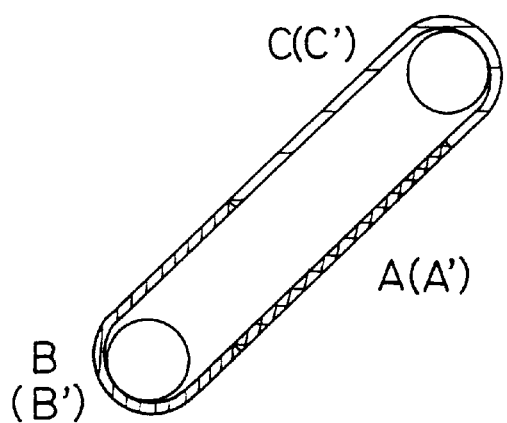
FIGS. 3A and 3B illustrate a hologram device in Embodiment 1.
Figure 3B:
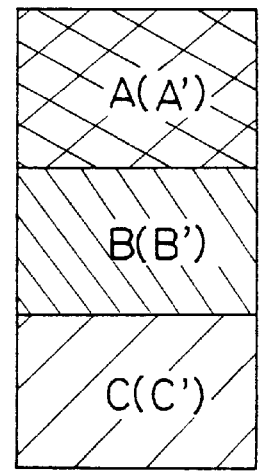

In this embodiment, as shown in FIGS. 3A and 3B, the first and the second hologram device 4, 5 are so constructed to have different Lippman holograms both in each area A, B, C and in each area A', B' C', the Lippman holograms being different from one another in diffraction angles for R, G and B. The areas A, B, C as well as the areas A', B', C' are moved by rotating the rotary mechanisms synchronously with the vertical scanning period of the liquid crystal display panel 7, so that incident angles of R, G and B to the liquid crystal panel are changed by turns. Here, the hologram elements for R, B and G are designed to reflect visible rays of about 600 nm or longer, about 500 nm or shorter and 500 nm to 570 nm in wavelength respectively.

FIG. 3B is a development of the hologram device entrained about the rotary mechanism. In this embodiment, layered three hologram elements corresponding to R, G and B are used. Alternatively, a multiple hologram element provided with the above light-division properties by being exposed to R, G and B may be used.

Figure 4:
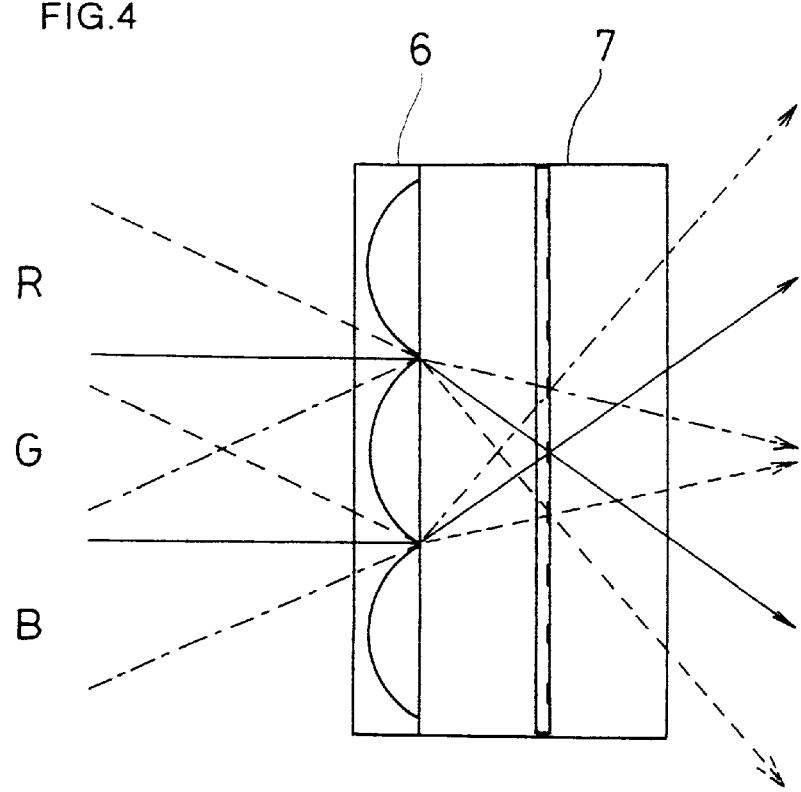
FIG. 4 illustrates state of divided lights being incident on a liquid crystal display panel in Embodiment 1.

Due to the optical system in the above arrangement, each of the lights R, G and B is diffracted by the corresponding reflection type hologram element and then directed onto the microlens array 6 disposed to the liquid crystal panel 7. By selecting the incident angle of a luminous flux of each of the colors properly as described below, the luminous flux is directed to a pixel corresponding to the color as shown in FIG. 4. The condition for the proper selection is that the incident angles of the luminous fluxes of any two of the colors R, G and B satisfies the following formula:

$\tan \theta = P/f$   Formula (3)

wherein $\theta$ is a difference between the incident angles of the two luminous fluxes, f is a focal length of the microlens in air, and P is a horizontal distance between the pixels corresponding to the colors.

In this embodiment, Omni Dex 600 manufactured by Du Pont is used as a material for recording hologram. Two parallel luminous fluxes are emitted onto the recording material by an argon laser (of 488 nm wavelength) with adjusting the angle between the two luminous fluxes, and generated interference fringes are recorded.

The above-mentioned hologram recording material is a polymeric recording film containing monomers, an initiator and a sensitizing dye as described on pages 87 to 90 of "New Development in Photopolymer Technique" published by Toray Research Center, Ltd. A interference pattern corresponding to each of R, G or B can be recorded in hologram by the following three steps:

(a) Exposure to laser light: 20 mJ/cm$^2$ (sum of object light intensity and reference light intensity)

(b) Ultraviolet-light irradiation: 100 mJ/cm$^2$ (c) Heating: 120° C. (2 hours)

In the initial state, monomers are uniformly distributed in the recording film. When the film is exposed to laser light, monomers are polymerized in the exposed site, to which monomers move from the circumference. Accordingly the density of monomers becomes higher in the exposed site and lower in the other site. At this moment, if the monomer and the polymer have different indexes of refraction, distribution of refraction indexes corresponding to an interference pattern is generated [the above step (a)]. Then ultraviolet light is irradiated on the whole surface of the film so that the polymerization of the monomers is completed [the above step (b)]. Finally, the modulation of fraction indexes is reinforced by heating [the above step (c)].

The light source for recording hologram may be a He—Ne laser, YAG laser, Kr laser or the like instead of the argon laser. Other hologram materials then the above-mentioned photopolymer may be any material capable of making a volume hologram such as gelatin dichromate and silver halogenide.

The recording of interference pattern on the hologram element used in the present invention can be carried out at a time, because the microlens array converges the lights to the corresponding pixels of the liquid crystal display panel and therefore the hologram device does not need to have periodicity corresponding to the pixel pitch.

From the formula (3), when a microlens of focal length f=720 $\mu$m (corresponding to a thickness of 1.1 mm between opposing substrates of liquid crystal display panel in a glass substrate) is used on a liquid crystal display panel having the pixel pitch 130 $\mu$m×130 $\mu$m, $\theta = \tan^{-1}(P/f) = \tan^{-1}(130/720) \approx 10°$ is obtained.

When the liquid crystal panel is driven non-interlacingly, three vertical scannings for R, G and B are carried out during a period of a frame. When the liquid crystal panel 7 is driven interlacingly, three vertical scannings for R, G and B are carried out during a period of a field, that is, six vertical scannings are carried out in a period of a frame, since one frame consists of two fields.

Since the liquid crystal panel 7 in this embodiment is interlacingly driven, the time period T for a field is $T = 1/(30 \times 2) \approx 16.6$ (msec), when the time period for a frame is 1/30 sec. Within this time period T, a round switch of the area A to B to C as well as the area A' to B' to C' must be completed. Therefore, the vertical scanning period is one third of the time T, about 5.5(msec). In addition, since the display is required to be blanked out during the change of the image signals, i.e., the change of the color lights, the liquid crystal display panel used in the invention may preferably have a response time of 1 msec or less.

In this embodiment, a TN(twisted nematic)-mode liquid crystal display panel is used, but any display panel such as bistable nematic liquid crystal or ferroelectric liquid crystal may be used provided that it has a response time equal to or less than the above-mentioned vertical period.

Figures 5, 6:
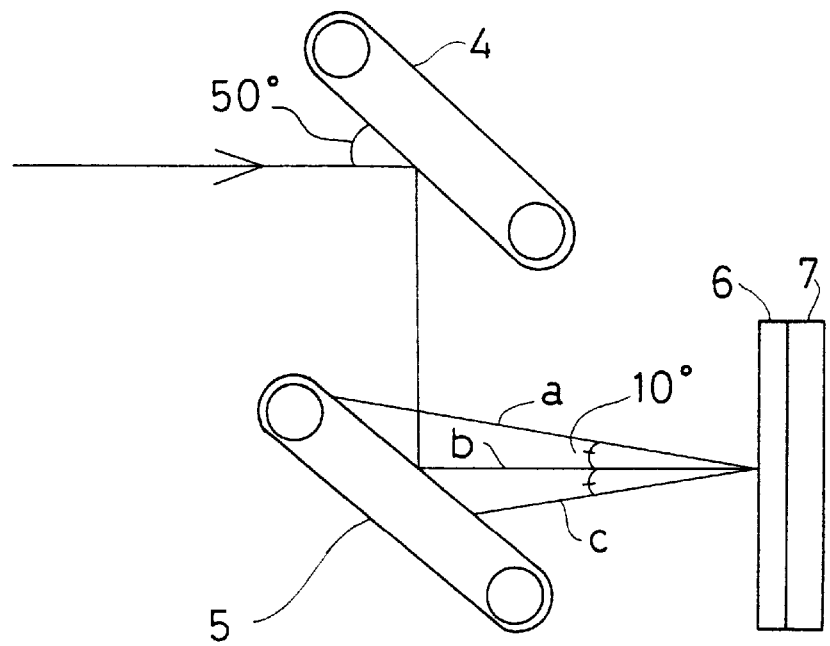
FIG. 5 illustrates an optical system in Embodiment 1.
FIG. 6 illustrates the switching of lights R, G and B incident on three areas a, b and c on the liquid crystal display panel in Embodiment 1.

Under the above-described conditions, each of the areas A, B and C as well as the areas A', B' and C' of the first and the second hologram device is made corresponding to each of three vertical scanning periods. Lights a, b, c shown in FIG. 5 are changed to one another by moving the areas A, B and C as well as the areas A', B' and C' sequentially (see FIG. 6). Image data corresponding to each of the lights is input to each of the pixels of the liquid crystal display panel synchronously with the change of the lights. Thus, realized is a one-panel liquid crystal projection with much higher effectiveness in light utilization and three-times as good resolution, compared with the conventional one-panel projection using the color filter.

Figure 7:
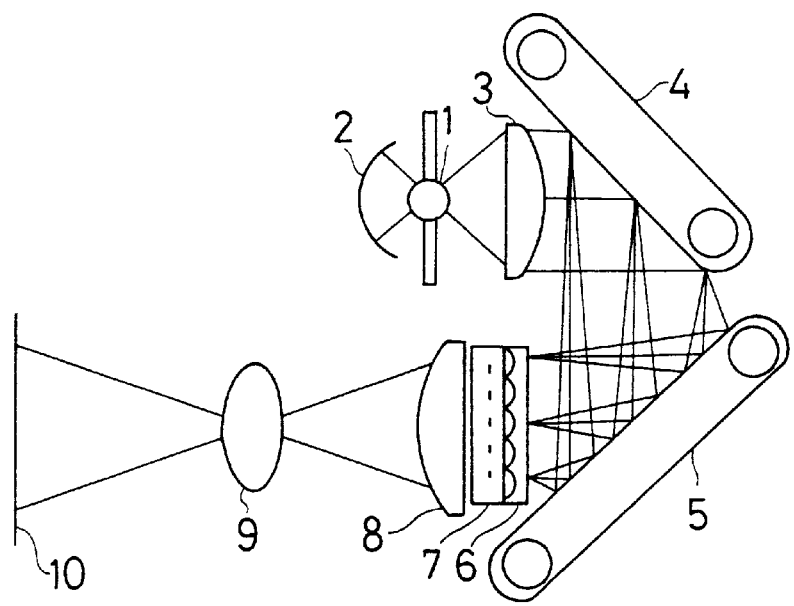
FIG. 7 illustrates another arrangement of the hologram devices.
Figure 8:
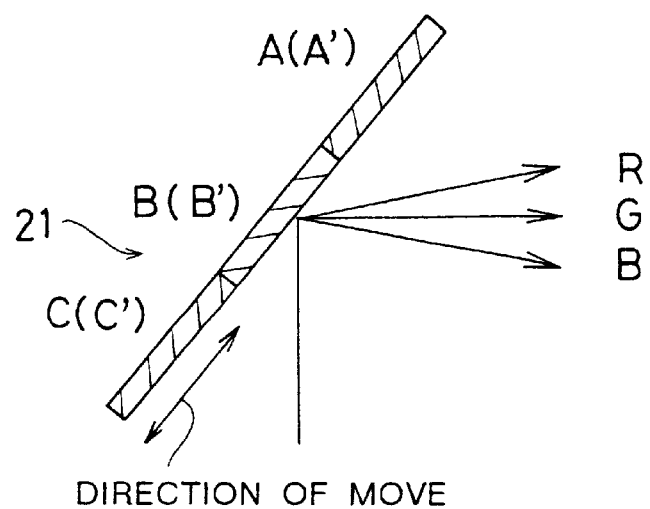
FIG. 8 illustrates a hologram device in another shape.
Figure 9:
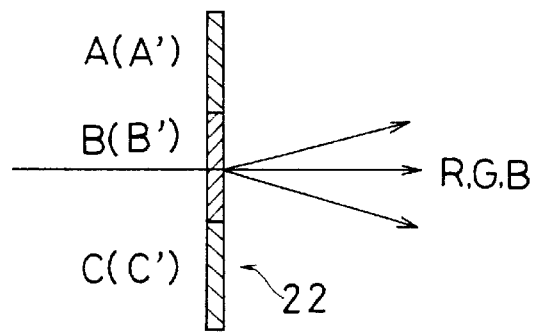
FIG. 9 illustrates a transmission type hologram device.
Figure 10A:
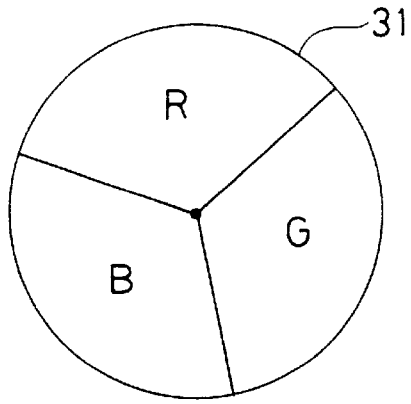
FIGS. 10A and 10B illustrate a state where dichroic mirrors are used in Embodiment 1.
Figure 10B:
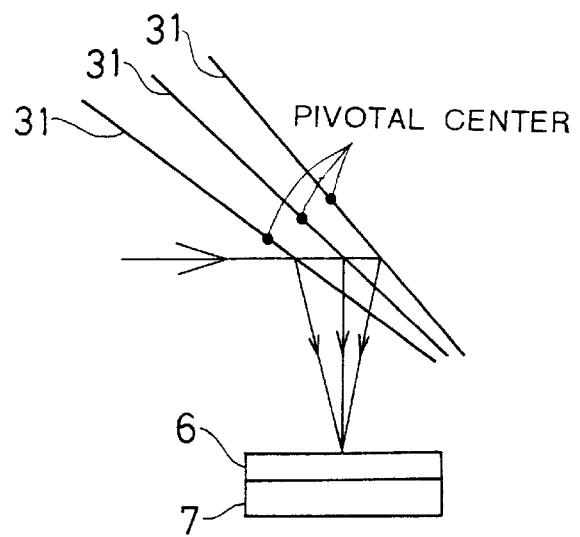

Though arranged in parallel in this embodiment, the first and the second hologram device 4, 5 may be arranged in the shape of / \ as shown in FIG. 7 with the equal effects. Alternatively, referring to FIG. 8, a plate hologram 21 may be used as the hologram device, which is moved to switch areas A, B, C and A', B', C'. Also, like a transmission type hologram device 22 shown in FIG. 9, any device may be used, provided that it can sequentially switch the incident angles of the lights R, G and B synchronously with the vertical scanning period of the liquid crystal display panel. For example, as shown in FIG. 10A, three disc-shaped dichroic mirrors 31 may be used as the dielectric mirror instead of the hologram device, which is arranged as shown in FIG. 10B and switches the lights R, G and B.

In place of the microlens, a transmission type hologram device provided with the same effects as the microlens may be used.

In this embodiment, the emitted light is made incident on the first and the second hologram device 4, 5 at the angle shown in FIG. 5, but the incident angels are not limited thereto provided that the value θ meets the formula (3).

EMBODIMENT 2

Figure 11:
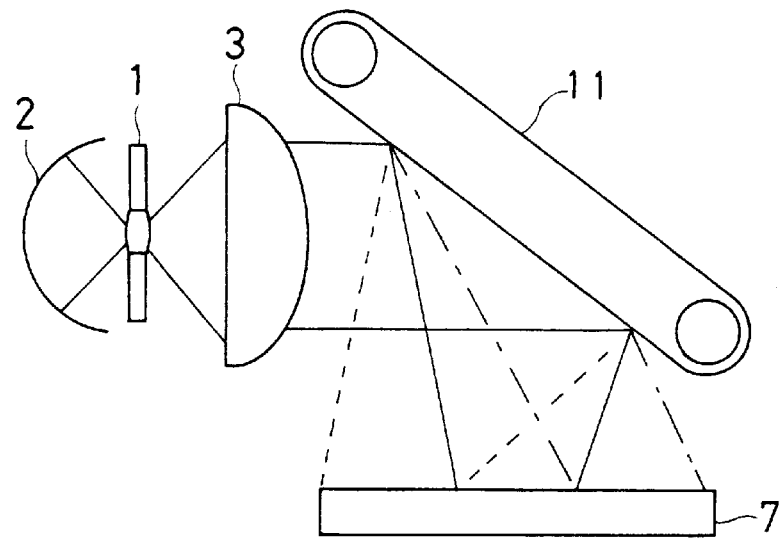
FIG. 11 illustrates a system of a projection color image display device in Embodiment 2.

FIG. 11 illustrates a system of a projection color image display device of Embodiment 2. Like reference numerals denote the same constituents as in Embodiment 1 and description thereof is omitted.

The light-emitting system is the same as described in Embodiment 1 (including the light source 1, the spherical lens 2 and the condenser lens 3). A hologram device 11 disposed as the optical means ahead of the condenser lens 3 diffracts the lights R, G and B contained in the light from the light source 1 in different directions and direct the lights onto different areas of the liquid crystal display panel 7. Then the lights R, G and B modulated by the liquid crystal display panel 7 pass through the field lens 8, and then are projected onto the screen 10 by the projection lens 9 (the field lens 8, the projection lens 9 and screen 10 not being shown in the figure). The liquid crystal display panel 7 interlacingly drives scanning lines of 480(H)×640(V). The pixel pitch is 130 μm×130 μm.

In this embodiments, as in FIG. 3, a reflection type hologram device is constructed to have different Lippman holograms in the areas A, B and C as well as in the areas A', B' and C', the Lippman holograms differing from one another in diffraction angles for the lights R, G and B. The areas A, B and C are moved synchronously with the vertical scanning period of the liquid crystal display panel 7 by the caterpillar-like rotating mechanism (drive device) as the color-changing means so that the sites of the liquid crystal display panel 7 on which the lights R, G and B are incident are switched by turns. Here, the hologram element for R reflects a visible light of wavelength of about 600 nm or longer, that for B reflects a visible light of wavelength of about 500 nm or shorter, and that for G reflects a visible light of wavelength of 500 nm to 570 nm.

In this embodiment, three hologram elements corresponding to R, G and B are used in layers. Alternatively, one multiple hologram element provided with the above light-division properties by being multi-exposed to R, G and B may be used. The hologram device 11 is made in the same manner as described in Embodiment 1.

The vertical scanning period of the liquid crystal display panel used in this embodiment, as described in Embodiment 1, preferably has a response of 1 msec or less.

Figure 12:
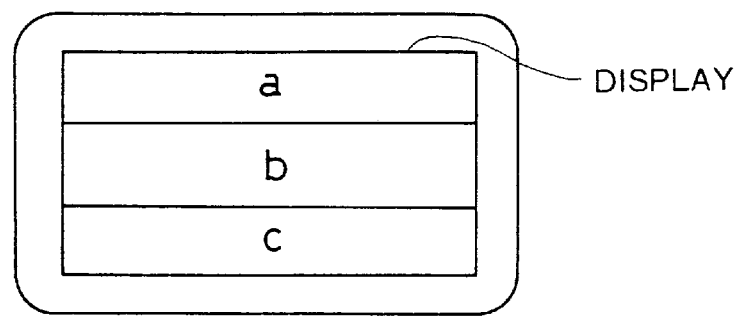
FIG. 12 illustrates areas illuminated with lights of wavelengths on the projection color image display device in Embodiment 2.

Under the above-described conditions, the areas A, B and C of the hologram device 11 are switched corresponding to the three periods of the vertical scanning of the liquid crystal display panel so that the lights incident on three areas a, b and c of the liquid crystal display panel 7 as shown in FIG. 12 are consecutively switched (see FIG. 6). Then image data corresponding to each of the lights are input to each of the pixels of the liquid crystal display panel synchronously with the change of the lights. Thus, compared with the conventional one-panel projection using the color filter, realized is a one-panel liquid crystal projection with much higher effectiveness in light utilization and three-times as good resolution.

Figure 13:
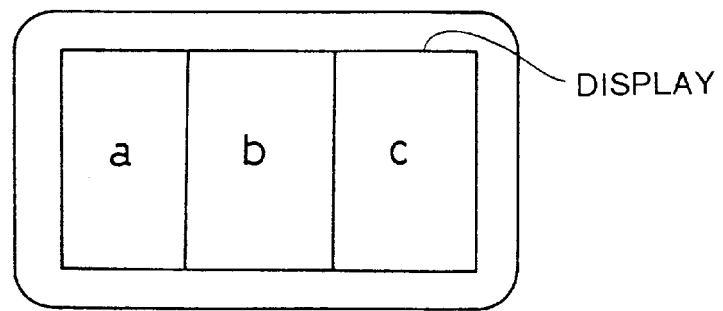
FIG. 13 illustrates another example of the areas illuminated with the lights of wavelengths on the projection color image display device in Embodiment 2.

Although divided into three vertically arranged portions (horizontally divided into three) in this embodiment, the liquid crystal panel 7 may be divided into three horizontally arranged portions (vertically divided into three) as shown in FIG. 13. The areas irradiated by the lights R, G and B do not have to be divided equally.

Figure 14:
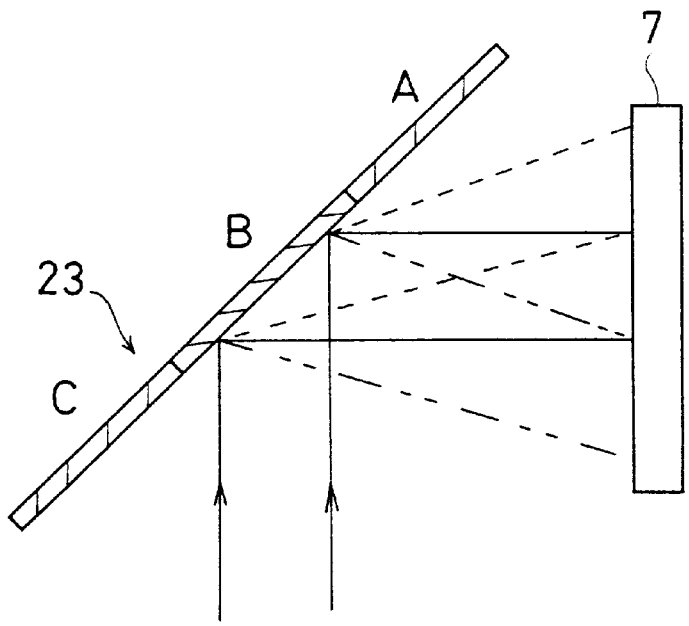
FIG. 14 illustrates a hologram device in another shape.
Figure 15:
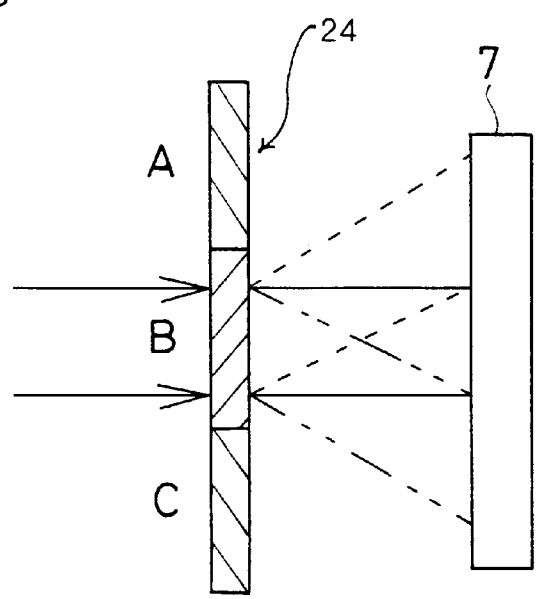
FIG. 15 illustrates a transmission type hologram device.

As the hologram device 11, a plate hologram 23 shown in FIG. 14 may be used, which is moved to switch areas A, B and C. Also, like a transmission type hologram device 24 shown in FIG. 15, any device may be used, provided that it can switch the incident angles of the lights R, G and B synchronously with the vertical scanning period of the liquid crystal display panel. For example, as shown in FIGS. 10A and 10B for Embodiment 1, three disc-shaped dichroic mirrors 31 may be used as the dielectric mirror. However, in this case, the dichroic mirrors must be arranged to have such angles that the lights divided by the dichroic mirrors are incident on different areas of the liquid crystal display panel.

EMBODIMENT 3

Figure 16:
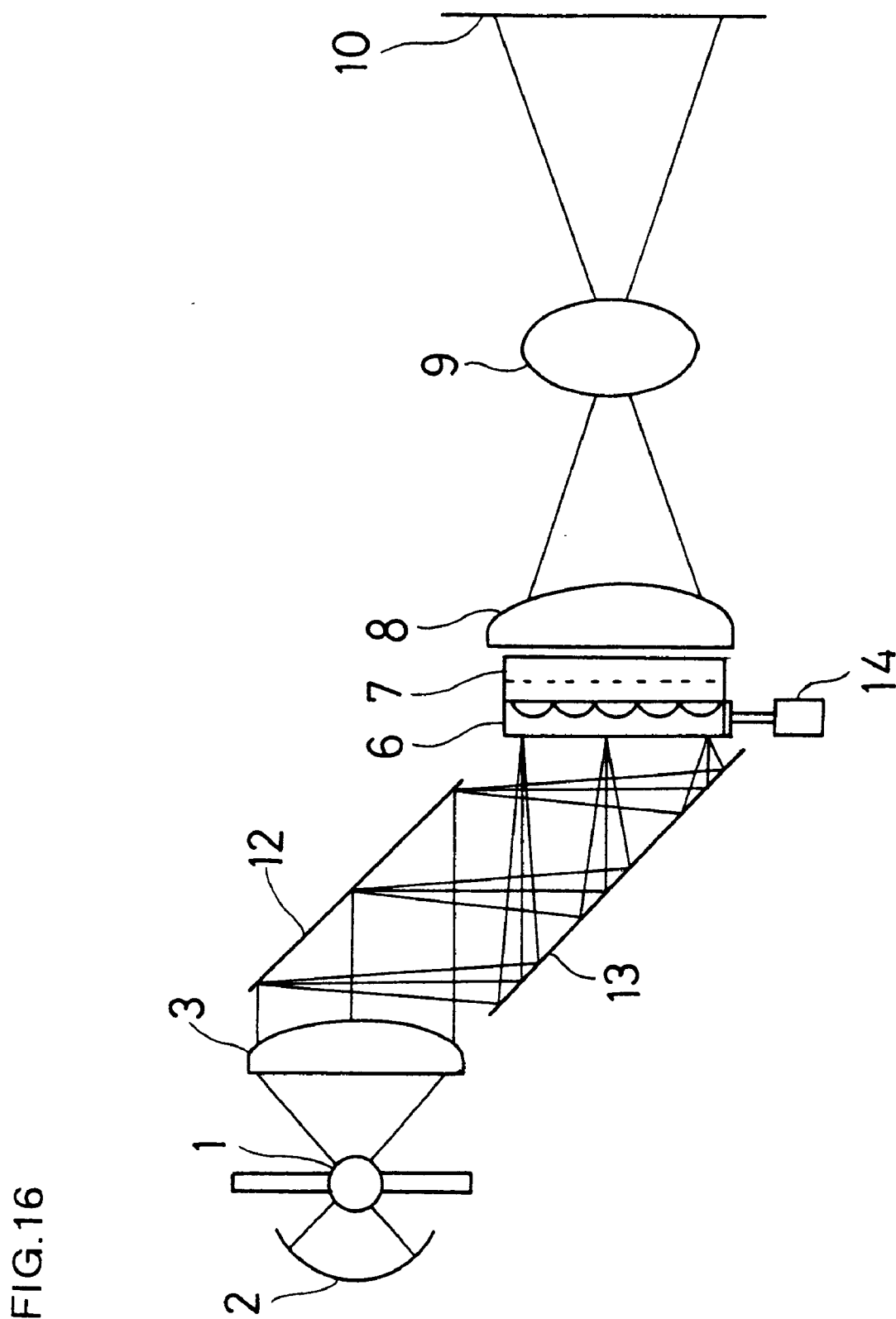
FIG. 16 illustrates a system of a projection color image display device in Embodiment 3.

FIG. 16 illustrates a system of a projection color image display device of Embodiment 3. Like reference numerals denote the same constituents as in Embodiment 1 and description thereof is omitted.

The light-emitting system is the same as described in Embodiment 1 (including the light source 1, the spherical lens 2 and the condenser lens 3). A first reflection type hologram device 12 and a second reflection type hologram device 13 are disposed as the optical means ahead of the condenser lens 3. The first hologram device 12 diffracts the lights R, G and B contained in the light from the light source 1 in different directions. The second hologram device 13 receives the diffracted lights R, G and B from the first hologram device 12, and then diffracts the lights so that they are incident at different angles on the liquid crystal display panel 7 provided with the micro lens array 6. Provided to the microlens array 6 as the light-collecting means is an actuator 14 (drive device) as the color-changing means which moves the microlens array by pixel pitch of the liquid crystal display panel 7. As the actuator 14, a motor, a solenoid, a piezo-electric element and the like may be used. The lights R, G and B modulated by the liquid crystal display panel 7 pass through the field lens 8, and then are projected onto the screen 10 by the projection lens 9.

Figure 17:
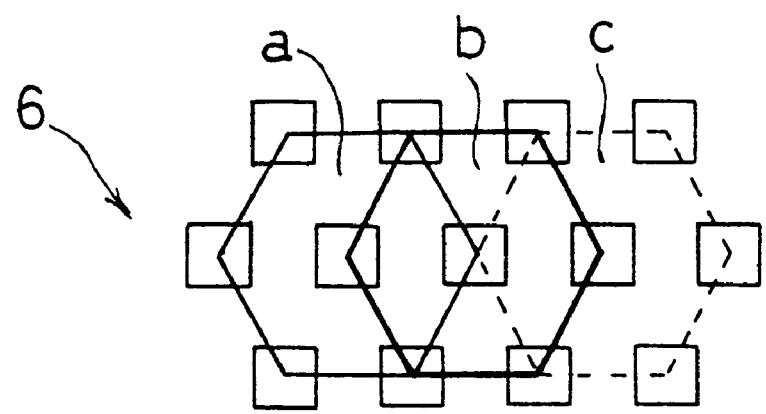
FIG. 17 illustrates movement of a microlens in Embodiment 3.

In this embodiment, one microlens corresponds to three pixels of the liquid crystal display panel 7. As shown in FIG. 17, the microlens is sequentially moved by pixel pitch to positions a, b and c in the figure synchronously with the vertical scanning period of the liquid crystal display panel so that the lights R, G and B directed into an aperture of a pixel of the liquid crystal display panel is changed by turns. The liquid crystal display panel interlacingly drives scanning lines of 480(H)×640(V). The pixels are in delta arrangement of 130 μm×130 μm. The incident angle of the lights R, G, B to the liquid crystal display panel is 10° as in the Embodiment 1.

In this embodiment, three Lippman holograms corresponding to each of the lights R, G, B are used in layers to form the first and the second hologram device 12, 13. The hologram element for R is designed to reflect a visible light of about 600 nm or longer, that for B to reflect a visible light of about 500 nm or shorter, and that for G to reflect a visible light of 500 to 570 nm. Alternatively, one multiple hologram element provided with the above light-division properties by being multi-exposed to R, G and B may be used. The hologram devices 12, 13 are made in the same manner as described in Embodiment 1.

The vertical scanning period of the liquid crystal display panel used in this embodiment, as described in Embodiment 1, preferably has a response of 1 msec or less.

Under the above-described conditions, the microlens is moved to the positions a, b and c in three periods of the vertical scanning of the liquid crystal display panel so that the lights incident on the pixels of the liquid crystal display panel 7 are sequentially switched time-divisionally as shown in FIG. 6. Then image data corresponding to each of the lights are input to the pixels of the liquid crystal display panel synchronously with the change of the lights. Thus, compared with the conventional one-panel projection by use of color filters, realized is a one-panel liquid crystal projection with much higher effectiveness of light utilization and three-times as good resolution.

Figure 18:
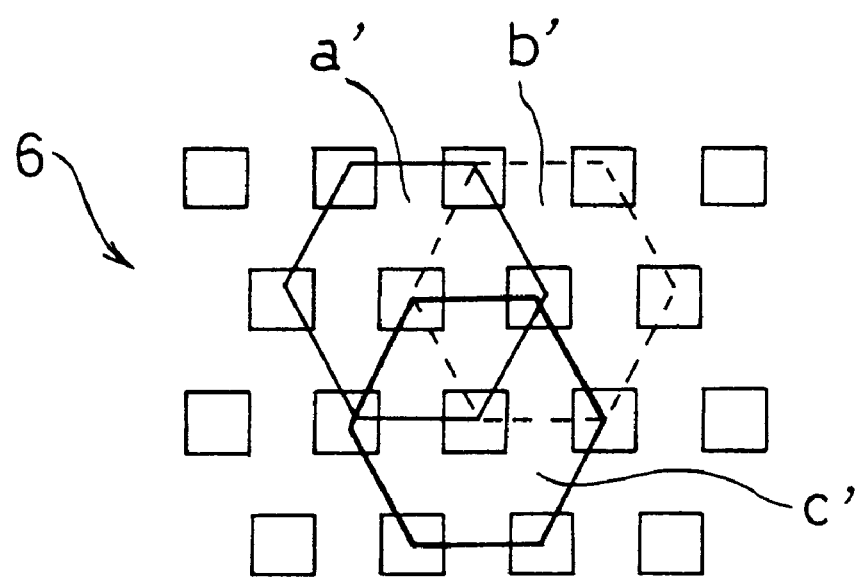
FIG. 18 illustrates another movement of the microlens in Embodiment 3.

Although a liquid crystal display panel 7 with the pixels in delta arrangement is used in this embodiment, the present invention may be applied for a liquid crystal display panel with the pixels in stripe arrangement. In the place of the microlenses, a transmission type hologram device provided with the same effects may be used. In addition, although moved in the horizontal direction synchronously with the vertical scanning period of the liquid crystal display panel in this embodiment, the microlenses may be moved in the directions to a', b' and c' shown in FIG. 18.

Figure 19:
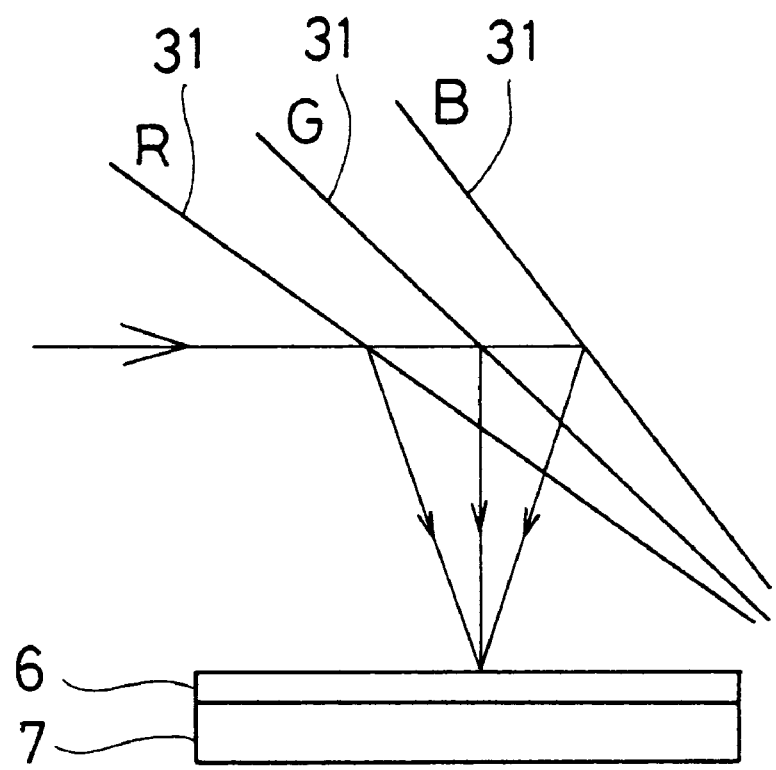
FIG. 19 illustrates a state where dichroic mirrors are used in Embodiment 3.

In this embodiment, the reflection type hologram devices are used as the first and the second hologram device 12, 13 for dividing the light, but the hologram device is not limited thereto provided that it can divide light, for example, a transmission type hologram device. Alternatively, instead of the hologram devices 12, 13, three dichroic mirrors 31 as the dielectric mirror may be used as shown in FIG. 19.

EMBODIMENT 4

Figure 20:
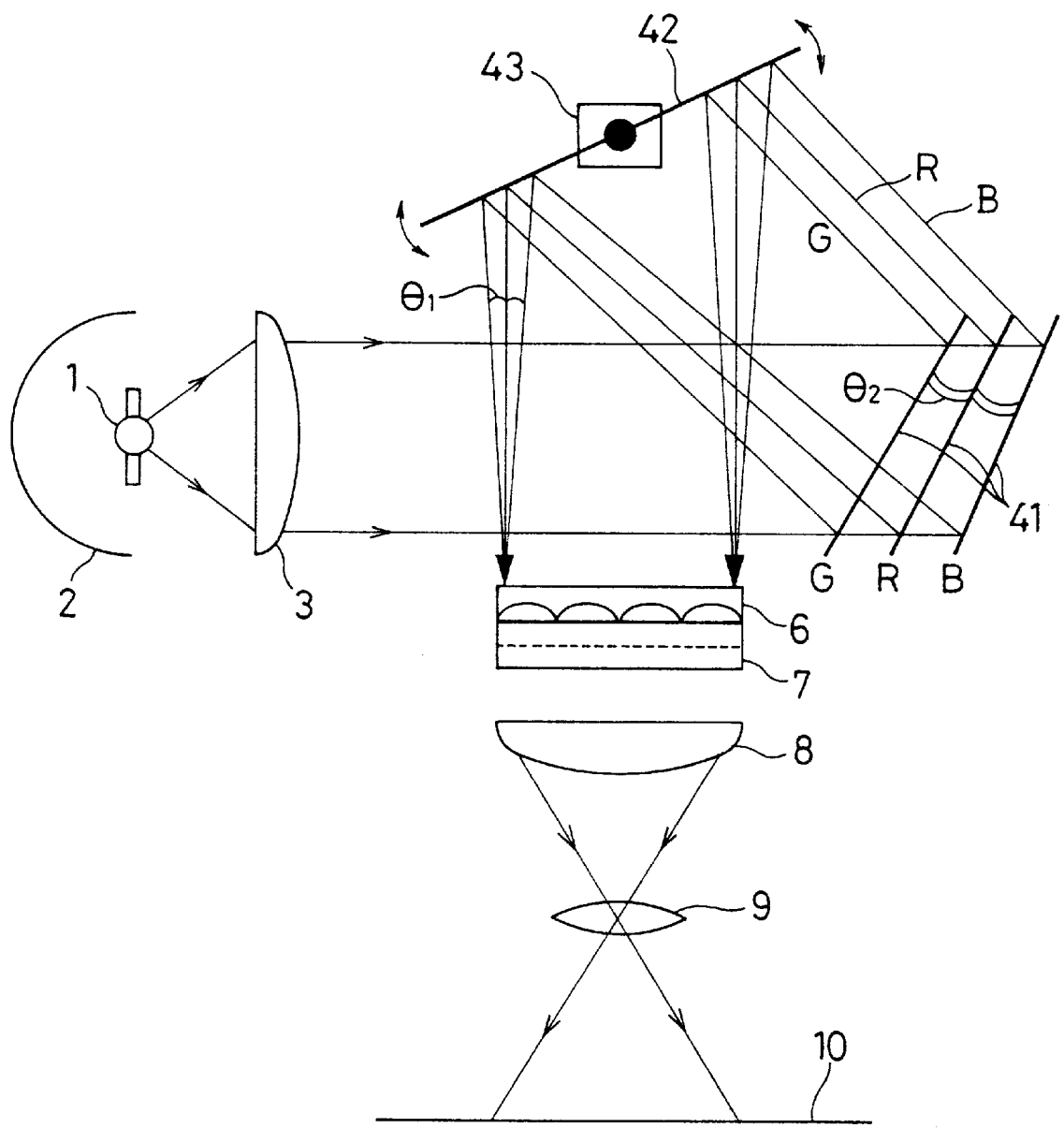
FIG. 20 illustrates a system of a projection color image display device in Embodiment 4.

FIG. 20 illustrates a structure of a projection color image display device of Embodiment 4. Also in this embodiment, the invention will be explained with reference to a projection color image display device. Like reference numerals denote the same constituents as in Embodiment 1.

Referring to the figure, reference numeral 1 denotes a light source, 2 a spherical mirror, 3 a condenser lens, 7 a liquid crystal display device provided with a microlens array 6 as the light-collecting means, 8 a field lens, 9 a projection lens and 10 a screen.

It is noted the same light-emitting system (including the light source 1, the spherical mirror 2 and the condenser lens 3), the same liquid crystal display panel 7 provided with the microlens array 6, and the same projection system (made of the field lens 8, the projection lens 9 and the screen 10) as described in Embodiment 1 are used in this embodiment.

Reference numeral 41 denotes a dielectric mirror as the optical means. The dielectric mirror 41 is constructed to have three dielectric mirrors for R, G, and B disposed to make angles of $\theta_2$° to each other. The dielectric mirror may be a dichroic mirror. Reference numeral 42 denotes a plane mirror, and the optical means in this embodiment includes the three dielectric mirrors 41 and the plane mirror 42. Reference numeral 43 denotes a stepping motor (drive device) as the color-changing means for changing the angle of the plane mirror 42.

In this embodiment, the image display panel consists of the liquid crystal display panel 7, but the image display panel may be other types of image display panels. As the light source 1, a metal halide lamp of 150 W, 5 mm in arc length, and 2.2 mm in arc diameter is used and disposed so that the arc of the light source 1 is horizontal to the surface of the sheet on which the figure is drawn. Alternatively, the light source 1 may be a halogen lamp or a xenon lamp. The spherical mirror 2 is disposed behind the light source 1 and the condenser lens 3 of 80 mmϕ in caliber and 60 mm in focal length is disposed ahead of the light source 1.

The spherical mirror 2 is disposed so that the center thereof agrees with the center of the light-emitting portion of the light source 1. Further, the light source 1 is disposed so that the center thereof agrees with the focus of the condenser lens 3. Due to such an arrangement, the parallel degree of the light which is emitted by the light source 1 and passes through the condenser lens 3 is about 2.2 in the direction of the arc length (direction horizontal to the sheet) and about 1 in the direction of the arc diameter.

Disposed ahead of the condenser lens 3 are the three dielectric mirrors 41 for reflecting the luminous fluxes R, G and B in the light emitted by the light source 1 to direct them from different directions onto the plane mirror 42.

The plane mirror 42 directs the lights R, G and B reflected by the dielectric mirrors 41 onto the liquid crystal display panel 7 provided with the microlens array 6. The luminous fluxes R, G and B incident onto the liquid crystal display panel 7 are modulated, pass through the field lens 8, and then are projected on the screen 10 by the projection lens 9.

The dielectric mirror for R is designed to reflect a visible light of wavelength about 600 nm or longer, that for B is designed to reflect a visible light of wavelength about 500 nm or shorter and that for G is designed to reflect a visible light of wavelength from 500 nm to 570 nm. In this embodiment, for division into R, G and B, the three corresponding dielectric mirrors 41 are used, but a reflection type hologram device having the same function may be used.

Figure 21:
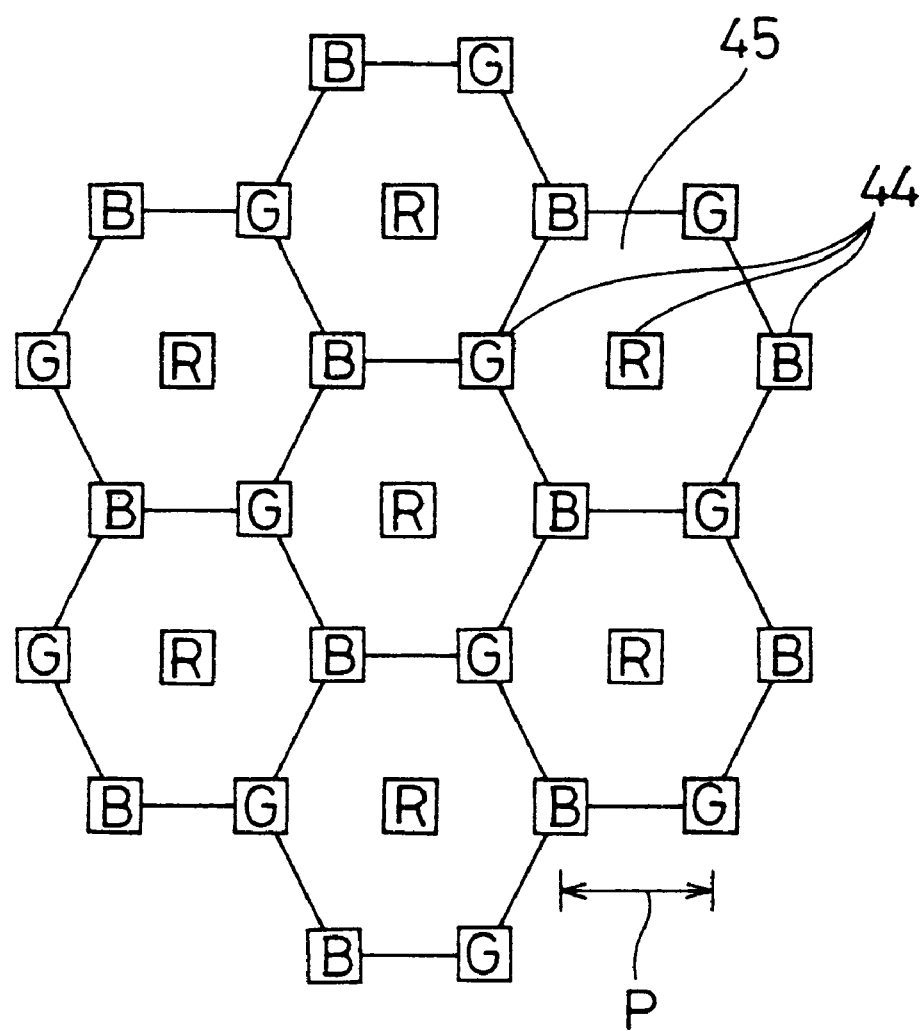
FIG. 21 illustrates layout of microlenses in Embodiment 4.

Referring to FIG. 21, one microlens 45 corresponds to threef pixels 44 of the liquid crystal display panel 7 in this embodiment. The liquid crystal display panel 7 interlacingly drives scanning lines of 480(H)×640(V). The pixel pitch is 130 μm×130 μm. The incident angles of the lights R, G, B to the microlens array 6 provided to the liquid crystal display panel 7 are obtained from the pixel pitch P of the liquid crystal display panel 7 and the focal length f of the microlens array 6 as described later.

In this embodiment, the angles of the plane mirror 42 to the lights R, G and B from the dielectric mirror 41 are switched to one another with the stepping motor 43 as the drive device synchronously with the vertical scanning period of the liquid crystal display panel 7, thereby the incident angles of the lights R, G and B to the liquid crystal display panel 7 being switched by turns.

Here, to simplify explanation, other components of the liquid crystal display panel 7 such as a polarizing plate, an orientation film and a black matrix are not referred to, and also the explanation is given about only one beam of light as representing other beams. The drive device may be a piezoelectric device, etc. in place of the stepping motor 43.

Figure 22:
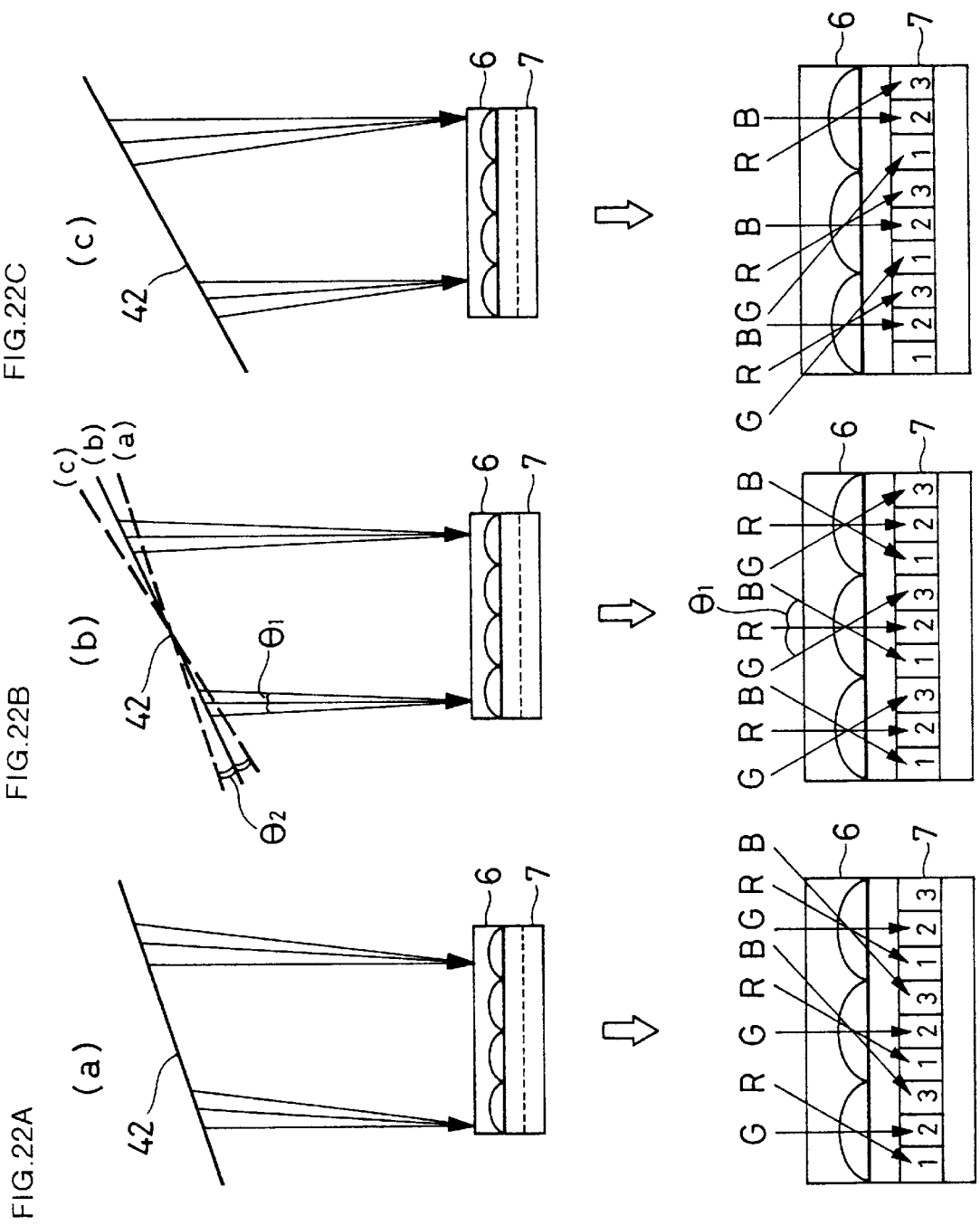
FIGS. 22A, 22B and 22C illustrate states of divided lights being incident on the liquid crystal display panel in Embodiment 4.

When the optical system is arranged as described above, each of the luminous fluxes is directed to a corresponding pixel by the microlens array 6, as shown in FIGS. 22A, 22B and 22C, by properly selecting the state (a), (b) or (c) for the incident angle of each of the luminous fluxes based on the following. For any two of the luminous fluxes R, G and B, difference $\theta_1$ between the incident angles of the two luminous fluxes to the microlens array 6, the focal length f of the microlens in air and a pitch P between the pixels corresponding to the colors of the two luminous fluxes in the horizontal direction meet the following formula:

$$\tan \theta_1 = P/f \quad \text{Formula (4)}$$

Such difference is given by the angles made by the three dielectric mirrors 41.

By changing the angles of the plane mirror 42 to the incident luminous fluxes G, R and B by $\theta_2$, the pixel on which each of the luminous fluxes is incident can be sequentially changed. The angle $\theta_2$ equals the angles made by the three dielectric mirrors 41 and meets the following formula:

$$\theta_2 = \theta_1/2 \quad \text{Formula (5)}$$

Under the above-mentioned conditions, when the liquid crystal display panel has a pixel pitch of 130 μm×130 μm and the microlens has a focal length of 720 μm (corresponding to a thickness of 1.1 mm between opposing liquid crystal substrates in a glass substrate), the following is obtained from the formulae (4) and (5):

$$\theta_1 = \tan^{-1}(P/t) = \tan^{-1}(130/720) \approx 10°$$

$$\theta_2 = 5°$$

As for the drive of the liquid crystal display panel 7, when the drive is non-interlacing, three vertical scannings are carried out during a frame. When the drive is interlacing, three vertical scannings are carried out during a field and thus six scannings are carried out during a frame since a frame is composed of 2 fields.

Since the liquid crystal display panel 7 used in this embodiment operates the interlacing drive, the time T for a field is $$T = 1/(30 \times 2) \approx 16.6 \text{ (msec)}$$

when a frame is 1/30 sec. Accordingly, the incident angle of the luminous flux on the plane mirror 42 needs to be changed three times within the time T. Therefore, the time period for the vertical scanning of the liquid crystal display panel 7, i.e., the vertical scanning period, is one third of the time T, that is about 5.5 msec. Further, since the display must also be blank out during the switch of image signals, i.e., the switch of the color lights, it is preferable to use a liquid crystal display panel having a response of 1 msec or less.

In this embodiment, an OCB-mode liquid crystal display panel is used, but any display panel having the above-mentioned response may be used, such as bistable nematic liquid crystal and ferroelectric liquid crystal.

Under the above-described conditions, the angles of the plane mirror 42 to the incident luminous fluxes R, G and B are sequentially changed (three times) in every three periods of the vertical scanning of the liquid crystal display panel 7 so that each of the pixels of the liquid crystal display panel 7 sequentially receives the three luminous fluxes, and image data corresponding to the colors of the received luminous fluxes are sequentially input to each of the pixels of the liquid crystal display panel synchronously with the change of the luminous fluxes. Thus, compared with the conventional one-panel projection using the color filter, a one-panel projection with much higher effectiveness in utilizing light and three times as good as resolution has been realized.

EMBODIMENT 5

Figure 23:
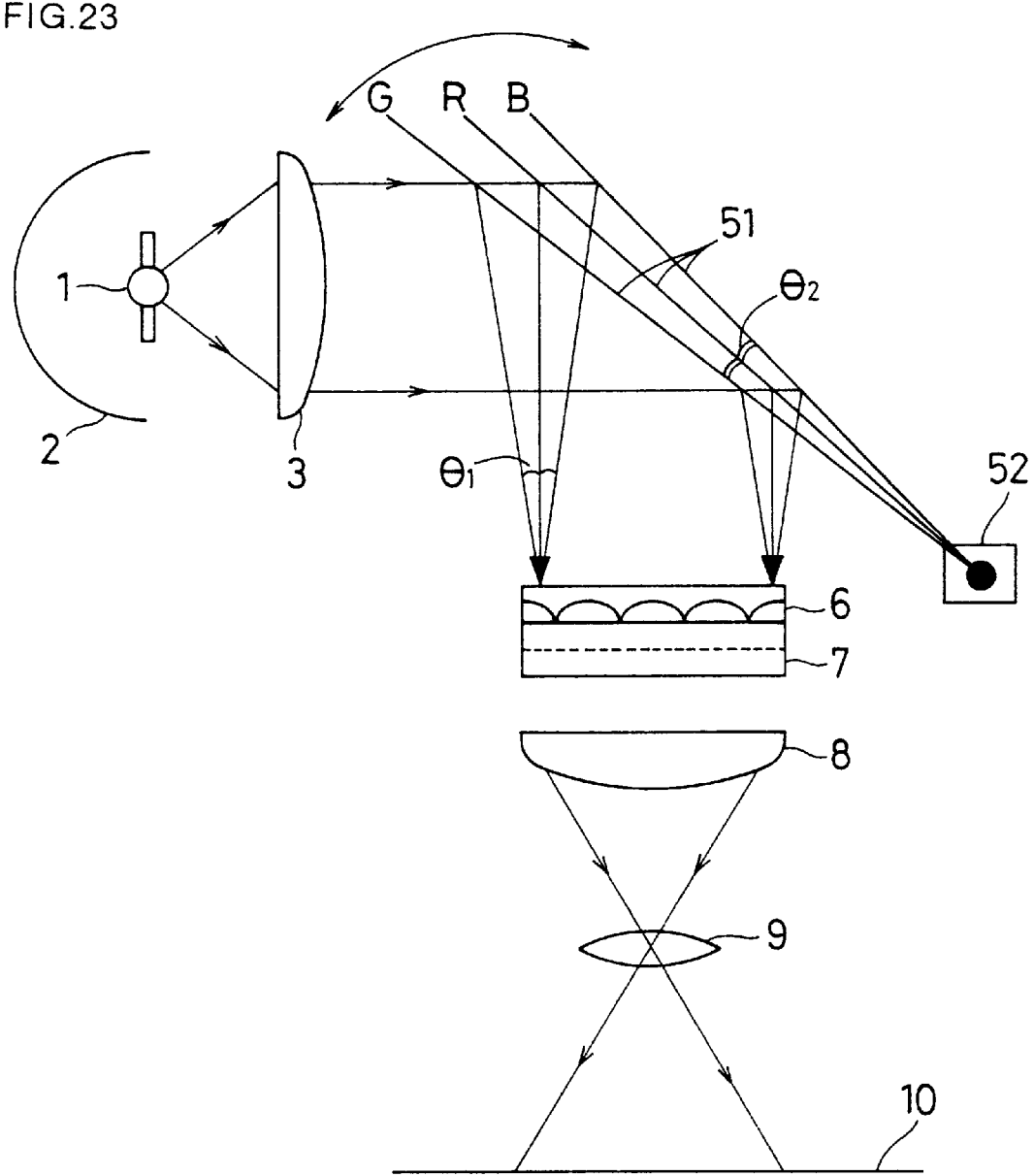
FIG. 23 illustrates a system of a projection color image display device in Embodiment 5.

FIG. 23 illustrates a structure of a projection color image display device Embodiment 5. Also in this embodiment, the invention will be explained with reference to a projection color image display device. Like reference numerals denote the same constituents as in Embodiment 1.

The light-emitting system is the same as described in Embodiment 1 (including the light source 1, the spherical mirror 2 and the condenser lens 3). Disposed ahead of the condenser lens 3 is a dielectric mirror 51 consisting of three dielectric mirrors as the optical means for reflecting the luminous fluxes R, G and B in the light emitted by the light source 1 so that the luminous fluxes overlap from different directions on the display area of the liquid crystal display panel 7. The three dielectric mirrors of the dielectric mirror 51 for R, G and B are disposed to make angles of $\theta_2$ to each other. The dielectric mirror may be a dichroic mirror. The luminous fluxes R, G and B reflected by the dielectric mirror 51 are modulated by the liquid crystal display panel 7 provided with the microlens array 6 as the light-collecting means, pass through the field lens 8, and then are projected on the screen 10 by the projection lens 9.

In this embodiment, the microlens array 6, liquid crystal display panel 7 and projection system (including the field lens 8, projection lens 9 and screen 10) are the same as described in Embodiment 4.

In this Embodiment, as shown in FIGS. 24A, 24B and 24C, the angles of the three dielectric mirrors 51 to the white light from the light source 1 are sequentially changed to the states (a), (b) and (c) so that the incident angles of the lights R, G and B to the liquid crystal panel 7 are sequentially changed. As the drive device as the light-changing means for changing the angles of the dielectric mirrors 51, a stepping motor 52 is used as described in Embodiment 4.

By setting proper incident angles $\theta_1$ of the luminous fluxes R, G and B to the microlens array 6 which are defined by the angles made of the three dielectric mirrors 51, each of the luminous fluxes can be directed to a pixel of the color of the luminous flux, as shown in FIGS. 24A, 24B and 24C. Also by shifting the positions of the three dielectric mirrors 51 by the angle of $\theta_2$ so as to change the angles of the three dielectric mirrors 51 to the white light from the light source 1, the incident angles of the luminous fluxes R, G and B to the microlens array 6 can be changed by $\theta_1$, thereby each of the luminous fluxes being directed to another pixel by the microlens array 6. The angle $\theta_2$ corresponds to the angles made by the three dielectric mirrors 51. These angles $\theta_1$ and $\theta_2$ are obtained as described in Embodiment 4, Formulae (4) and (5) bringing $\theta_1=100$ and $\theta_2=5°$ respectively.

Even if the angles of the three dielectric mirrors 51 to the white light from the light source 1 are changed, the luminous fluxes of the plural wavelengths can be overlapped in the same display area when the center for changing the angles is selected as follows.

Figure 25:
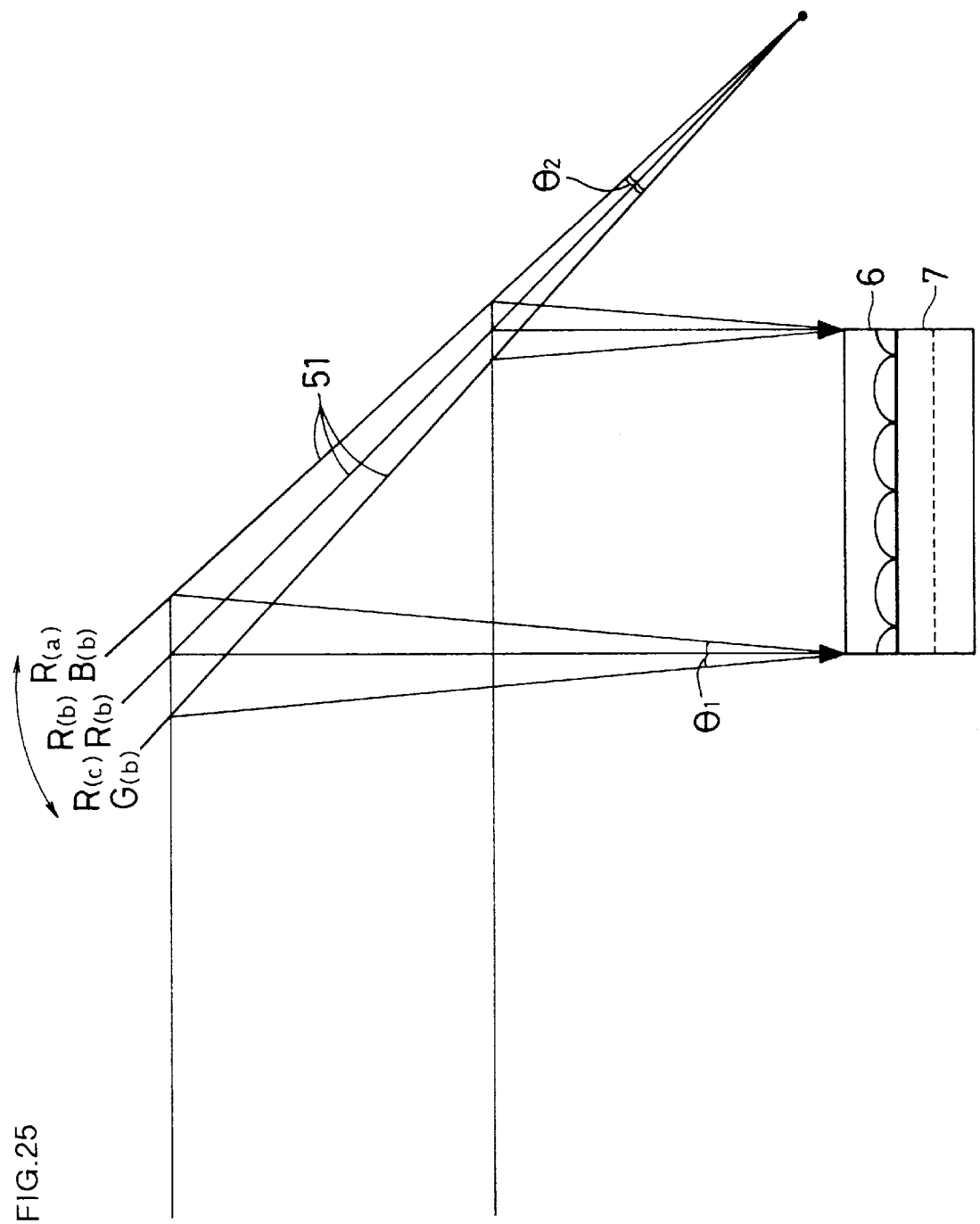
FIG. 25 illustrates change in the angle of an dielectric mirror to white light form a light source in Embodiment 5.

This will be explained with reference to FIG. 25. In the state of FIG. 24B, the three dielectric mirrors 51 are so arranged that the luminous fluxes R, G and B irradiate overlapping at the display area of the liquid crystal display panel 7. Here, since the shifting angle $\theta_2$ equals the angles made by the three dielectric mirrors 51, the area on which the luminous fluxes R, G and B overlap is not changed by the changing of the angles of the three dielectric mirrors 51 to the white light. Therefore, loss of light does not occur, thus the light being effectively utilized.

In this embodiment, for the division into the lights R, G, B, the three corresponding dielectric mirrors are used, but a reflection type hologram device having the same function may be used.

In this embodiment, the incident angle and the reflection angle of the luminous flux to the dielectric mirror 51 are changed by ±5°. At this moment, the wave range of the light reflected by the dielectric mirror 51 shifts about ±5 nm according to the incident angle. An observer perceives average chromaticity during a field period (i.e., a period when the angle of the dielectric mirror 51 to the incident luminous flux is changed three times) of the liquid crystal display panel 7. Accordingly, the wave ranges reflected by the three dielectric mirrors for R, G and B are set so that the chromaticity has sufficient color reproducibility.

That is to say, the dielectric mirrors are designed so that the wave ranges reflected by the dielectric mirrors 51 in FIGS. 24A, 24B and 24C are set as shown in FIGS. 26, 27 and 28, so as to have sufficient color-reproductivity when the lights of these wave ranges are overlapped.

The vertical scanning period of the liquid crystal display panel used in this embodiment, as described in Embodiment 4, preferably has a response of 1 msec or less.

Under the above-mentioned conditions, the angle of the dielectric mirror 51 to the white light from the light source 1 is sequentially changed (three times) in every three periods of the vertical scanning of the liquid crystal display panel 7 so that each of the pixels of the liquid crystal display panel 7 sequentially receives the three luminous fluxes, and image data corresponding to the colors of the received luminous fluxes are sequentially input to each of the pixels of the liquid crystal display panel synchronously with the change of the luminous fluxes. Thus, compared with the conventional one-panel projection using the color filter, a one-panel projection with much higher effectiveness in utilizing light and three times as good as resolution has been realized.

The present invention has realized low-cost color image display with high resolution and scarce light loss, while at the same time the advantage of the one-panel system of being compact is maintained, by dividing the white light from the light source into the luminous fluxes of red, green and blue, directing each of the luminous fluxes to a corresponding pixel of the liquid crystal display panel, and sequentially changing the color of light incident to each of the pixels to red, green and blue time-divisionally.

What is claimed is:

1. A projection image display device comprising:

a light source;

an image display panel having a number of pixels and a vertical scanning function;

an array of optical elements for collecting light incident from different directions and directing the collected light into apertures of respective pixels of the image display panel;

optical means for dividing light from the light source into a plurality of lights of different wave ranges and directing and overlapping the divided plural lights onto each optical element from different directions simultaneously;

projection means for projecting an image displayed on the image display panel; and color-changing means for sequentially interchanging, synchronously with the vertical scanning of the image display panel, the different directions in which the optical means directs the plural divided lights of the different wave ranges, so as to sequentially interchange wave ranges of light directed to the pixels of the image display panel sequentially;

wherein the image display panel displays an image with each of the pixels sequentially displaying the different wave ranges.

2. The projection image display device according to claim 1, wherein the optical means comprises a hologram element having different diffraction angles for the different wave ranges and the color-changing means comprises a drive device for sequentially changing the diffraction angles of the hologram element synchronously with the vertical scanning of the image display panel.

3. The projection image display device according to claim 1, wherein the optical means comprises a plurality of dielectric mirrors corresponding to the plural divided lights and the color-changing means comprises a drive device for sequentially changing the corresponding wave ranges of the plural dielectric mirrors synchronously with the vertical scanning of the image display panel.

4. The projection image display device according to claim 1, wherein the array of optical elements comprises a microlens array.

5. The projection image display device according to claim 1, wherein the array of optical elements comprises a transmission type hologram element having different diffraction angles for the different wave ranges.

6. The projection image display device according to claim 1, wherein the image display panel comprises a liquid crystal display panel;

the optical means comprises a first hologram element for dividing the light from the light source into three primary colors of red, green and blue, a second hologram element for directing the red, green and blue lights divided by the first hologram element onto an area;

the light-collecting means comprises a microlens array for collecting each of the red, green and blue lights directed onto the area by the first and the second hologram elements into apertures of pixels of the liquid crystal display panel corresponding to the light; and the color-changing means comprises a drive device for moving the first and the second hologram elements synchronously with the vertical scanning of the liquid crystal display panel so as to change the color of light directed to each pixel of the liquid crystal display panel to red, green and blue sequentially.

7. The projection image display device according to claim 1, wherein the image display panel comprises a liquid crystal display panel;

the optical means comprises three dichroic mirrors for dividing the light from the light source into three primary colors of red, green and blue and directing the red, green and blue lights on an area;

the light-collecting means comprises a microlens array for collecting each of the red, green and blue lights directed onto the area by the three dichroic mirrors into apertures of pixels of the liquid crystal display panel corresponding to the light; and the color-changing means comprises a drive device for operating each of the three dichroic mirrors synchronously with the vertical scanning of the liquid crystal so as to change the color of light directed to each pixel of the liquid crystal display panel to red, green and blue sequentially.

8. A projection image display device comprising a light source:

an image display panel having a number of pixels and a vertical scanning function;

optical means having wave-length selectivity for dividing light from the light source into a plurality of lights of different wave ranges and directing each of the divided lights to a corresponding one of divisional areas of the image panel, said optical means comprising a hologram element having different diffraction angles for the different wave ranges, projection means for projecting an image displayed on the image display panel; and color-changing means for mutually changing, at every vertical scanning of the image display panel, the directions in which the optical means directs the plural lights of the different wave ranges, so as to mutually change the wave ranges of light directed to the divisional areas of the image display panel sequentially, wherein the image display panel displays an image with each of the divisional areas displaying a color of the wave range of light directed onto the divisional area at every change by the color-changing means, said color-changing means comprising a drive device for sequentially changing the diffraction angles of the hologram element synchronously with the vertical scanning of the image display panel.

9. The projection image display device according to claim 8, wherein the image display panel comprises a liquid crystal panel;

the optical means comprises a hologram element for dividing the light from the light source into three primary colors of red, green and blue and directing each of the red, green and blue lights to a corresponding one of three divisional areas of the liquid crystal display panel; and the color-changing means comprises a drive device for moving the hologram element synchronously with the vertical scanning of the image display panel so as to change the color of light directed onto each divisional area of the liquid crystal panel to red, green or blue sequentially.

10. A projection image display device comprising a light source;

an image display panel having a number of pixels and a vertical scanning function;

optical means for dividing light from the light source into a plurality of lights of different wave ranges and directing and overlapping the plural divided lights onto an area from different directions;

light-collecting means for collecting each of the plural divided lights directed onto the area by the optical means into apertures of pixels of the image display panel corresponding to the wave range of the light;

projection means for receiving lights modulated by the image display panel and projecting an image displayed on the image display panel; and color-changing means for moving the light-collecting means by pixel pitch at every vertical scanning of the image display panel so as to sequentially interchange the wave ranges of light directed to the pixels of the image display panel sequentially, wherein the image display panel displays an image with each of the pixels displaying a color of the wave range of light directed to the pixel at every change by the color-exchanging means.

11. The projection image display device according to claim 10, wherein the optical means comprises a hologram element having different diffraction angles for the different wave ranges.

12. The projection image display device according to claim 10, wherein the optical means comprises a plurality of dielectric mirrors corresponding to the plural divided lights.

13. The projection image display device according to claim 10, wherein the light-collecting means comprises a microlens array and the color-changing means comprises a drive device for moving the microlens array by pixel pitch.

14. The projection image display device according to claim 10, wherein the light-collecting means comprises a transmission type hologram element having different diffraction angles for the different wave ranges and the color-changing means comprises a drive device for moving the transmission type hologram element by pixel pitch.

15. The projection image display device according to claim 10, wherein the image display panel comprises a liquid crystal display panel;

the optical means comprises a first hologram element for dividing the light from the light source into three primary colors of red, green and blue, and a second hologram element for directing the red, green and blue lights divided by the first hologram element onto an area from different directions;

the light-collecting means comprises a microlens array for collecting each of the red, green and blue lights directed onto the area by the first and the second hologram elements into apertures of pixels of the liquid crystal display panel corresponding to the light; and the color-changing means comprises a drive device for moving the microlens array by pixel pitch synchronously with the vertical scanning of the liquid crystal display panel so as to change the color of light directed to each pixel of the liquid crystal display panel to red, green or blue sequentially.

16. The projection image display panel according to claim 10, wherein the image display panel comprises a liquid crystal display panel;

the optical means comprises three dichroic mirrors for dividing the light from the light source into three primary colors of red, green and blue and directing the red, green and blue lights onto an area from different directions;

the light-collecting means comprises a microlens array for collecting each of the red, green and blue lights directed onto the area by the three dichroic mirrors into apertures of pixels of the liquid crystal display panel corresponding to the light; and the color-changing means comprises a drive device for moving the microlens array by pixel pitch synchronously with the vertical scanning of the liquid crystal display panel so as to change the color of light directed to each pixel of the liquid crystal display panel to red, green or blue sequentially.

17. A projection image display device comprising a light source;

an image display panel having a number of pixels and a vertical scanning function;

optical means for dividing light from the light source and directing and overlapping the divided plural luminous fluxes onto an area from different directions;

color-collecting means for collecting each of the plural divided luminous fluxes of the different wave ranges into apertures of pixels of the image display panel corresponding to the wave range of the luminous flux;

projection means for receiving lights modulated by the image display panel and projecting an image displayed on the image display panel; and color-changing means for sequentially interchanging the incident angles of the plural luminous fluxes of the different wave ranges to the image display panel so as to change the wave range of light directed to each pixel of the image display panel sequentially, wherein the image display panel displays an image with each of the pixels sequentially displaying a color of the wave range of light directed to the pixel at every change by the color-changing means.

18. The projection image display device according to claim 17, wherein the light-collecting means comprises a microlens array.

19. The projection image display device according to claim 17, wherein the light-collecting means comprises a transmission type hologram element having different diffraction angles for the different wave ranges.

20. The projection image display device according to claim 17, wherein the optical means comprises a plurality of dielectric mirrors corresponding to the plural luminous fluxes of the different wave ranges, the dielectric mirrors being arranged in order on an optical path of a luminous flux of the light from the light source, and a plane mirror for reflecting the plural luminous fluxes of the different wave ranges from the plural dielectric mirrors onto the image display panel, and the color-changing means comprises a drive device for mutually changing angles of the plane mirror to the plural luminous fluxes of the different wave ranges.

21. The projection image display device according to claim 20, wherein a reflection type hologram element is used in place of the plural dielectric mirrors.

22. The projection image display device according to claim 17, wherein the optical means comprises a plurality of dielectric mirrors corresponding the plural luminous fluxes of the different wave ranges, the dielectric mirrors being arranged in order on an optical path of a luminous flux of the light from the light source, and the color-changing means comprises a drive device for mutually changing angles of the dielectric mirrors to the luminous flux from the light source.

23. The projection image display device according to claim 22, wherein a reflection type hologram element is used in place of the plural dielectric mirrors.

24. A projection image display device comprising a light source;

an image display panel having a number of pixels and a vertical scanning function;

optical means having wave-length selectivity for dividing light from the light source into a plurality of lights of different wave ranges and directing each of the divided lights to a corresponding one of divisional areas of the image display panel, said optical means comprising a plurality of dielectric mirrors corresponding to the plural divided lights;

projection means for projecting an image displayed on the image display panel; and color-changing means for mutually changing, at every vertical scanning of the image display means panel, the directions in which the optical means directs the plural lights of the different wave ranges, so as to mutually change the wave ranges of light directed to the display panel sequentially, wherein the image display panel displays an image with each of the divisional areas displaying a color of the wave range of light directed onto the divisional area at every change by the color-changing means;

said color-changing means comprising a drive device for sequentially changing the corresponding wave ranges of the plural dielectric mirrors synchronously with the vertical scanning of the image display panel.

25. The projection image display device according to claim 25, wherein the image display panel comprises a liquid crystal panel;

the optical means comprises three dichroic mirrors for dividing the light from the light source into three primary colors of red, green and blue and directing each of the red, green and blue lights to a corresponding one of three divisional areas of the liquid crystal display panel; and the color-changing means comprises a drive device for operating each of the three dichroic mirrors synchronously with the vertical scanning of the liquid crystal so as to change the color of light directed onto each divisional area of the liquid crystal display panel to red, green or blue sequentially.

* * * * *